United States Patent [19]

Chazelle et al.

[11] Patent Number: 5,495,249
[45] Date of Patent: Feb. 27, 1996

[54] GROUND SURVEILLANCE RADAR DEVICE, ESPECIALLY FOR AIRPORT USE

[75] Inventors: Xavier Chazelle, Saint-Cloud; Bernard Maitre, Elancourt; Bertrand Augu, Paris, all of France

[73] Assignee: Dassault Electronique, Saint Cloud, France

[21] Appl. No.: 243,128

[22] Filed: May 16, 1994

[30] Foreign Application Priority Data

Jun. 14, 1993 [FR] France ................................ 93 07149

[51] Int. Cl.$^6$ ........................................................ G01S 13/00
[52] U.S. Cl. .............................. 342/36; 342/29; 342/146; 342/147
[58] Field of Search .............................. 342/36, 29, 146, 342/147

[56] References Cited

U.S. PATENT DOCUMENTS

| | | | |
|---|---|---|---|
| 4,213,126 | 7/1980 | Mulder et al. | 342/36 |
| 4,516,125 | 5/1985 | Schwab et al. | 343/7.7 |
| 5,374,932 | 12/1994 | Wyschogrd et al. | 342/36 |

FOREIGN PATENT DOCUMENTS 2165414  6/1986  United Kingdom.

OTHER PUBLICATIONS

1993 IEEE National Radar Conferencea 20 Apr. 1993, Lynnfield, USA, pp. 17–22, Bethke et al 'A novelnear–range Radar Network for the Guidance and Control of Vehicles on Airport Manoeuvering Areas'.

*Primary Examiner*—J. Woodrow Eldred
*Attorney, Agent, or Firm*—Nixon & Vanderhye

[57] ABSTRACT

The surveillance radar device comprises, in combination, a fixed antenna for providing electronic scanning of space in bearing in the horizontal plane, a transmit source and microwave frequency transmit/receive means with a circulator, a transmit channel, a receive channel and means for subdividing the receive channel into a sum signal and at least one difference signal. A first and a second receiver element with frequency change respectively receive the sum and difference signals, and provide numerically coded outputs. Processing means process numerical signals from the first and second receiver elements for the radar detection of objects in the zone under surveillance.

21 Claims, 24 Drawing Sheets

GROUND SURVEILLANCE RADAR DEVICE, ESPECIALLY FOR AIRPORT USE

FIELD OF THE INVENTION

The invention relates to the technical field of radar devices for the surveillance of a zone, in particular a zone on the ground, and applies especially to airports, where there is a requirement for the surveillance of the aircraft, ground vehicles, and more generally all objects on the airport's manoeuvring area.

PRIOR ART

Panoramic type monitoring radars are already known which use an antenna revolving regularly around a vertical axis and observing at a given instant with the aid of a narrow radar beam, a vertical-edge dihedron, that is to say a small zone in azimuth around the antenna, thus making it possible to measure the azimuth of the detected aircraft. By likewise measuring the radial range of the aircraft, the horizontal position of an aircraft can be deduced therefrom. The aircraft are then for example displayed on a television-type circular screen in the form of luminous dots whose location corresponds to the horizontal position of the aircraft.

Air surveillance radars are also known which furthermore use, for the analysis of space in elevation, an antenna equipped with phase shifters whose phase shift is controlled at will and instantaneously so as instantaneously substantially to modify the direction of radiation.

The disadvantage of these two types of radar which each use a mechanically mobile antenna is in particular wastage of energy of radiation in unimportant directions.

Moreover, such radars are costly to develop and construct, this limiting their usage to major airports.

The present invention affords a solution to these problems.

OBJECTS OF THE INVENTION

Thus, a first object of the invention is to provide a fixed-antenna airport ground surveillance radar which is simple and inexpensive to implement.

Another object of the invention is to provide a radar of which the essential elements making it up are modular so as to allow the coverage of a wide spectrum of airports, ranging from large airports down to secondary airports.

It is a further object to provide a radar device for the surveillance of a zone on the ground, in particular of an airport, intended to be laid out according to a predetermined geometrical relationship with respect to said zone.

SUMMARY OF THE INVENTION

According to a general definition of the invention, the radar device comprises in combination:

at least one fixed antenna defining an array of radiating elements arranged in vertical columns and associated with an array of phase-shifter elements, the radiating elements of the various vertical columns all obeying the same phase law, whilst the setting of the phase shifters is able to change on command from one vertical column to the next, so as to provide electronic scanning of space in bearing in the horizontal plane, a transmission source, capable of delivering a microwave frequency signal with a predetermined power at at least one predetermined frequency, microwave frequency transmit/receive means, with:
  at least one circulator having an input connected to the transmission source, an input/output connected to the array of phase-shifter elements, and an output,
  at least one transmit channel capable of conveying the transmission signal to the array of phase-shifter elements, via the input of the circulator,
  at least one receive channel capable of conveying the HF signal received from the array of phase-shifter elements via the output of the circulator, and
  means for subdividing the receive channel into a sum signal and at least one difference signal, a first and a second receiver element with frequency change, respectively receiving the sum and difference signals and providing digital coded outputs, means for processing the digital output signals from the first and second receiver elements, for the radar detection of objects in the zone under surveillance, and means for controlling of the phase-shifter array.

Advantageously, said phase law is produced by construction of the vertical columns of radiating elements.

In a first embodiment of the device according to the invention, each column of radiating elements of the antenna is associated with a controlled phase-shifter element, and the microwave frequency transmit/receive means comprise:

m transmit/receive distributors, which subdivide the antenna into m groups of n columns of radiating elements, to which groups there correspond m groups of phase-shifter elements, m transmit/receive modules each having an input/output connected to one of the transmit/receive distributors, a transmit signal input, and a receive output, means for connecting the transmit inputs of the m transmit/receive modules to the transmit source, and means for constructing a sum signal and at least one difference signal from the receive outputs of the m transmit/receive modules.

In this first embodiment, each transmit/receive module comprises a solid-state power amplifier for transmission.

In a second embodiment of the device according to the invention each column of radiating elements of the antenna is associated with a controlled phase-shifter element, and the microwave frequency transmit/receive means comprise:

two transmit/receive distributors which subdivide the antenna and the phase shifters into left and right halves, means for constructing a sum signal and at least one difference signal from the two simple inputs/outputs of these two distributors, and a circulator whose input/output receives the sum signal, whilst its input is connected to the transmit source, and whilst its output and the difference signal are taken respectively to the first and second receiver elements.

In this second embodiment, the transmit source comprises a tube-based transmitter.

In practice the transmit source comprises a microwave frequency oscillator capable of transmitting a signal with a predetermined frequency and with a predetermined bandwidth, and a frequency synthesizer capable of providing local signals as well as of cooperating with the microwave frequency oscillator to allow discrete linear modulation of the transmission frequency from pulse to pulse by acting accordingly on the local signals, the linear modulation preserving the phase relationship between the various transmission frequencies.

Preferably, a column of radiating elements is produced via a waveguide with radiating slots, fed by a guide/coaxial transition.

In practice, the phase shifters are of the digitally controlled, diode-based reciprocal phase-shifter type.

According to another characteristic of the invention, each receiver element comprises at least one frequency change, followed by an amplitude/phase demodulation and by numerical coding, in the form of complex signals.

In practice, for each aiming of the antenna, the transmit cycle comprises the transmission of each of the various frequencies several times.

Advantageously, transmission frequencies are used in an order differing from the precise order of their nominal values.

Preferably, the cycle is repeated for a different value of the repetition frequency of the transmit pulses.

According to another aspect of the invention, the signal processing means are of the type with pulse compression in range, by monopulse deviation measurement in azimuth, and by Doppler processing in speed.

In practice the processing means comprise Fourier transformation means for the pulse compression and/or coherent integration.

Advantageously, the processing means carry out:

detection and filtering of radar blips from signals received, angle deviation measurement, fine-tuning in speed, and fine-tuning in range.

Advantageously, the fine-tuning in speed is accompanied by a removal of ambiguity in speed, using the second repetition frequency.

In practice the electronic antenna scanning is matched to the objects detected and to the zones to be surveyed.

In an illustrative embodiment of the device according to the invention, the analysis beam of the radiating element array exhibits an aperture of the order of 1.5° in azimuth along the axis, for an angle of scan in bearing of the order of 150°, with a lobe in elevation of inverse cosecant squared type.

The present invention also provides a radar installation for the surveillance of a zone.

According to a general definition, it comprises:

at least one radar device mentioned previously, and data processing means connected to the signal processing means for the ground radar surveillance of the said zone, dependant on the detection of the said objects.

Advantageously, a part at least of the signal processing means is shared between several radar devices.

BRIEF DESCRIPTION OF THE DRAWINGS

Other characteristics and advantages of the invention will emerge in the light of the detailed description below and of the drawings in which.

DETAILED DESCRIPTION OF A PREFERRED EMBODIMENT

The attached drawings are, for the most part, of a definite character.

Accordingly, they form an integral part of the present description. They will therefore be able not only to serve for the better understanding thereof, but also to contribute to the defining of the invention, as appropriate.

Generally, a ground surveillance radar surveys and manages the movements over a zone of terrain which, in the case of an airport, is the aircraft manoeuvring area comprising runways, taxiways and marshalling area.

Figure 1:
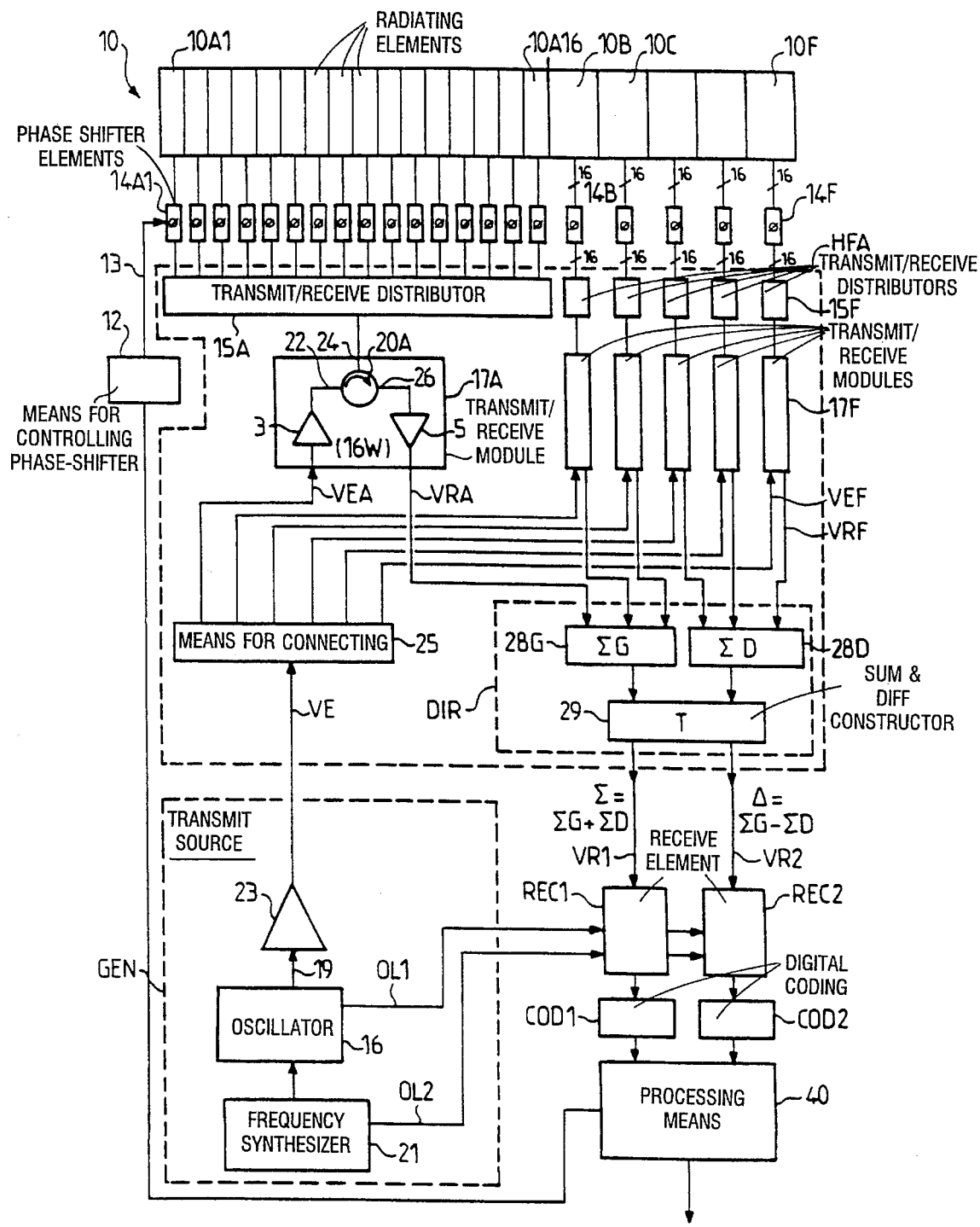
FIG. 1 is a diagrammatic representation of a radar with fixed antenna and solid-state amplifiers distributed according to the invention.
Figure 2:
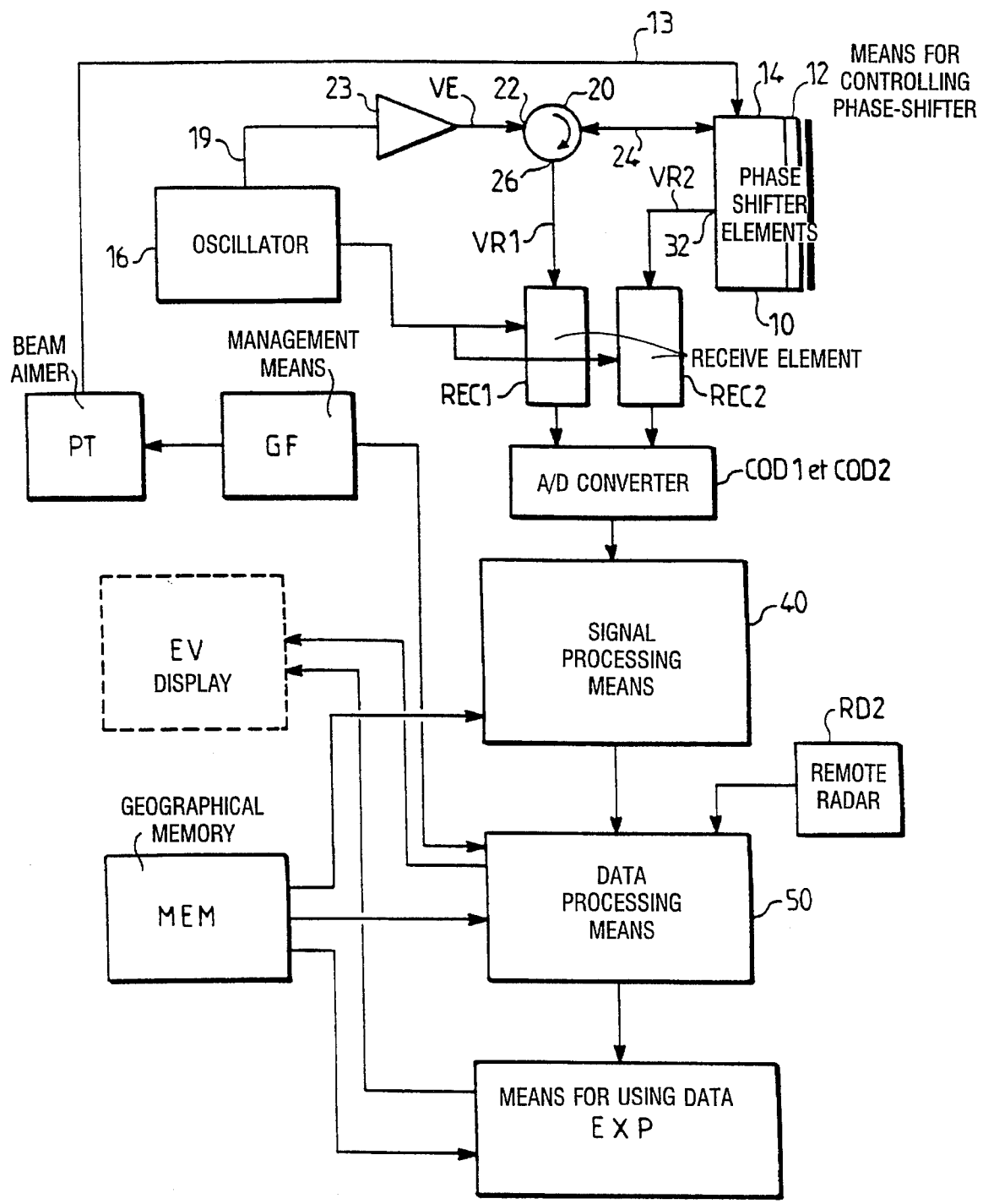
FIG. 2 is a simplified representation of the radar of FIG. 1.
Figure 3:
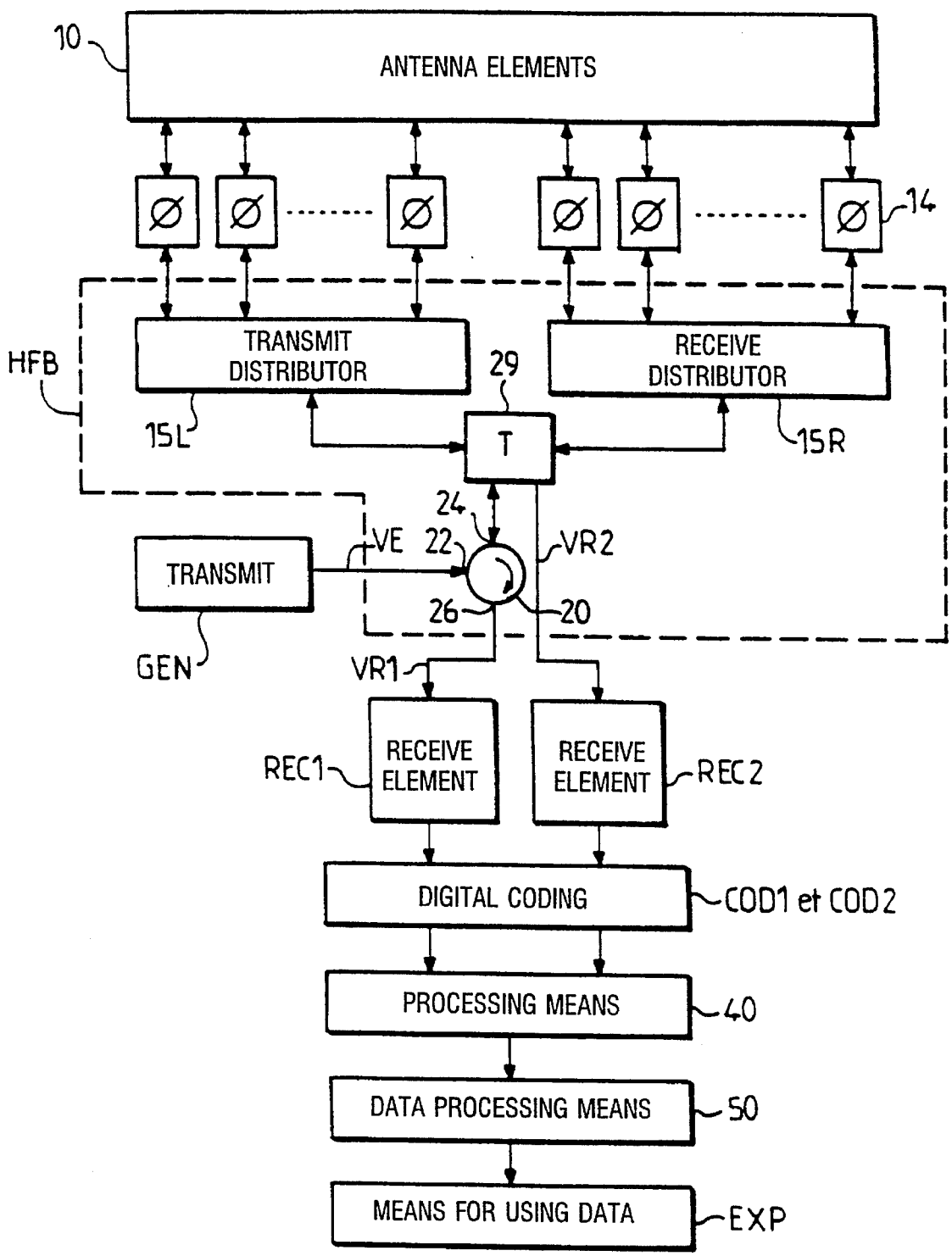
FIG. 3 is a diagrammatic representation of a radar with fixed antenna and with centralized transmitter according to the invention.

With reference to FIGS. 1 to 3, the radar device according to the invention comprises a fixed antenna 10, defining an array of radiating elements arranged in vertical columns, and associated with an array of phase-shifter elements 14. The radiating elements of the various vertical columns all obey the same phase law. The setting of the phase shifters can be modified on command from one vertical column to the next so as to provide electronic scanning of space in bearing in the horizontal plane.

The fact that this type of radar can be constructed with a fixed array-antenna has numerous advantages in comparison to the known large antennas with mechanical scanning:

a fixed antenna eliminates the rotational mechanics, thus increasing reliability and reducing the costs of implementation (elimination of the revolving joints in particular);

the fixed array antenna has the advantage of exhibiting slow degradation of performance, thus partly resolving problems of availability and maintenance; and moreover, it is much more easily set up in any building or structure.

In practice, the phase law is produced by construction of the vertical columns of radiating elements, as will be seen later.

Each column of radiating elements of the antenna 10A1–10A16 is associated with a controlled phase-shifter element 14A1–14A16 (instead of one phase shifter per individual radiating element).

The microwave frequency signal 19 to be transmitted is generated by a transmit source GEN, capable of delivering a microwave frequency signal HF with a predetermined power, of the order of 100 watts, at at least one predetermined frequency, which may for example be in the X band or in the KU band.

Two structures of the microwave frequency transmit/receive means are proposed (HFA-FIG. 1; or HFB-FIG. 3). In both cases, functionally they comprise (FIG. 2):

at least one circulator 20 having an input 22 for transmission, an input/output 24 connected to the array of phase shifter elements 14, and an output 26, at least one transmit channel VE which takes the transmit signal HF to the input 22 of the circulator, at least one receive channel VR or VR1 (sum) which takes the HF signal from the array of phase shifter elements 14, travelling via the input/output 24 and the output 26 of the circulator, at least one other receive channel VR2 (difference), which does not travel via the circulator, a first and a second receiver element REC1 and REC2 respectively with frequency change and receiving the sum and difference signals to provide numerically coded outputs, means 40 for processing the numerical signals from the first and second receiver elements REC1 and REC2, for the radar detection of objects in the zone under surveillance, and means 12 for controlling the phase-shifter array 14.

In the currently preferred version (FIG. 1), the microwave frequency transmit/receive means HFA comprise:

m (with m=6 for example) transmit/receive distributors 15, which subdivide the antenna into m groups of n (with n=16 for example) columns of radiating elements 10A–10F, to which groups there correspond m groups of phase-shifter elements 14A–14F, m transmit/receive modules 17A–17F, each having an input/output connected to one of the transmit/receive distributors, a transmit signal input, and a receive output, means 25 for connecting the transmit inputs of the m transmit/receive modules to the transmit source GEN, and means 28G, 28D, 29 for constructing a sum signal VR1 and at least one difference signal VR2, from the receive outputs of the m transmit/receive modules.

In this embodiment, each transmit/receive module comprises a solid-state power amplifier with a power of for example 16 watts.

In a variant embodiment (FIG. 3), the microwave frequency transmit/receive means HFB comprise:

two transmit/receive distributors 15L, and 15R, which subdivide the antenna and the phase shifters into left and right halves, means 29 for constructing a sum signal VR1 and at least one difference signal VR2 from the two simple inputs/outputs of these two distributors, a circulator 20 whose input/output receives the sum signal, whilst its input is connected to the transmit source, and whilst its output and the difference signal are taken respectively to the first and second receiver elements.

In this second embodiment a tube-based power transmitter is incorporated in the transmit source.

Generally, the transmit source GEN comprises a microwave frequency oscillator 16 operating at a predetermined frequency and a predetermined bandwidth. A frequency synthesizer 21, capable of providing local signals, is appended thereto. Preferably it also cooperates with the microwave frequency oscillator to allow discrete linear modulation of the transmission frequency, from pulse to pulse, which will be described further on; it acts accordingly on the local signals. In this way, the linear modulation can be obtained while preserving the phase relationship between the various transmission frequencies.

With reference to FIG. 2, the management means GF of the aiming of the beam PT addresses a memory for predetermined or recalculated aiming directions, the contents of which allows control of the phase-shifter elements 14 of the antenna 10. This management means relies in particular on the contents of a geographical memory MEM. In the application to the ground surveillance of an airport manoeuvring area, means EXP are provided for usage of the thus processed data.

Figure 4:
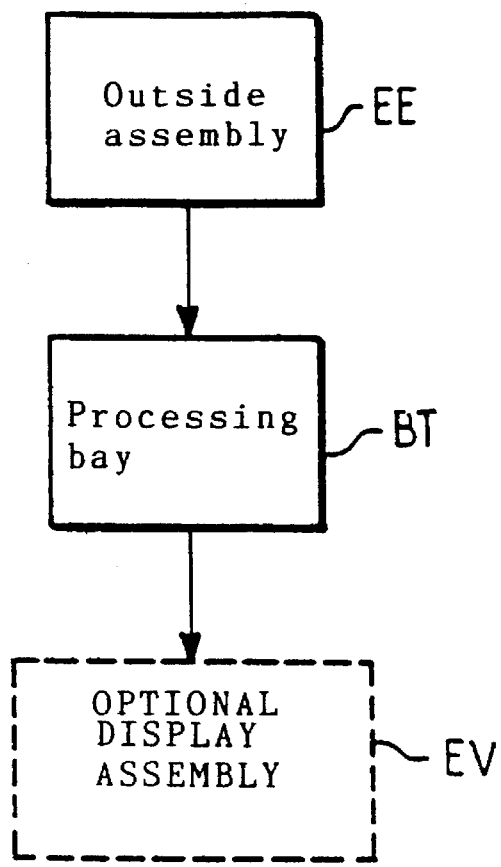
FIGS. 4 to 6 are respectively a diagram of the major functions of a radar installation with a fixed antenna according to the invention, layout diagrams of the fixed antenna and of one form of setting up this fixed antenna.
Figure 5:
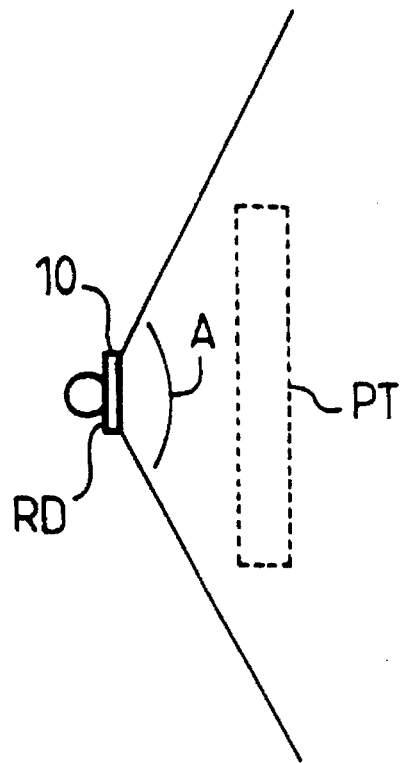
Figure 6:
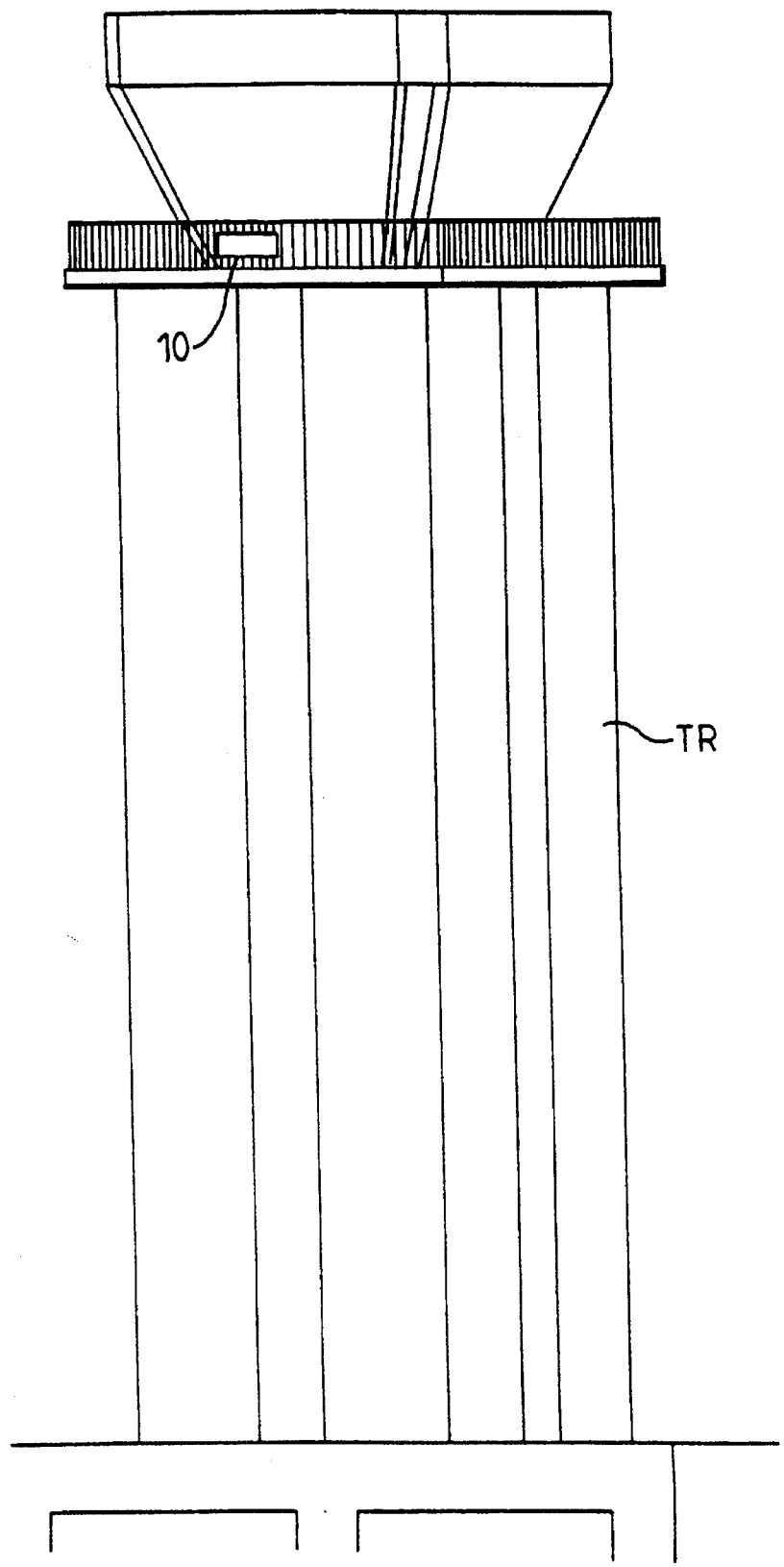

With reference to FIGS. 4 to 6, the fixed antenna 10 and the transmit/receive modules 17 are housed in an assembly EE situated outside, for example on the top of a control tower RT (FIG. 6), according to a predetermined geometrical relationship with respect to the airport manoeuvring area. FIG. 5 shows that a radar installation RD with a single fixed antenna 10 ensures coverage of an angle A of about 150° in bearing.

The generator means GEN as well as the signal processing means 40 and data processing means 50 are housed in an inside processing bay BT. As an option, the radar installation RD furthermore comprises a separate display assembly EV.

The configuration with three blocks EE, BT and, if appropriate, EV finds an advantageous application to airports with a single runway PT.

Figure 7:
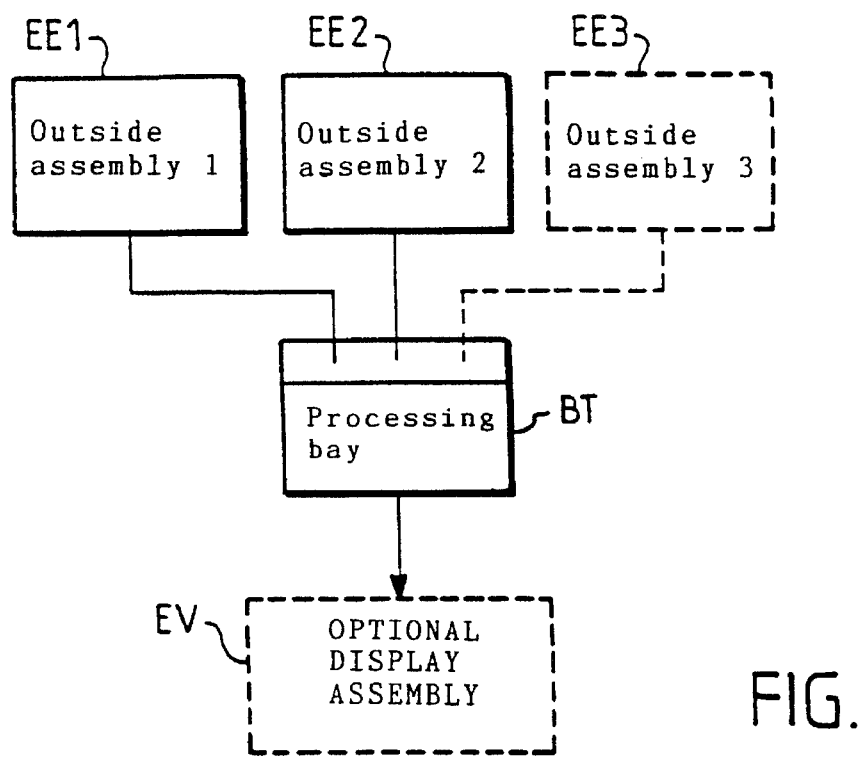
FIGS. 7 and 8 are respectively a diagrammatic representation of the major functions of a radar installation with two fixed antennas according to the invention, and a layout diagram of these two fixed antennas.
Figure 8:
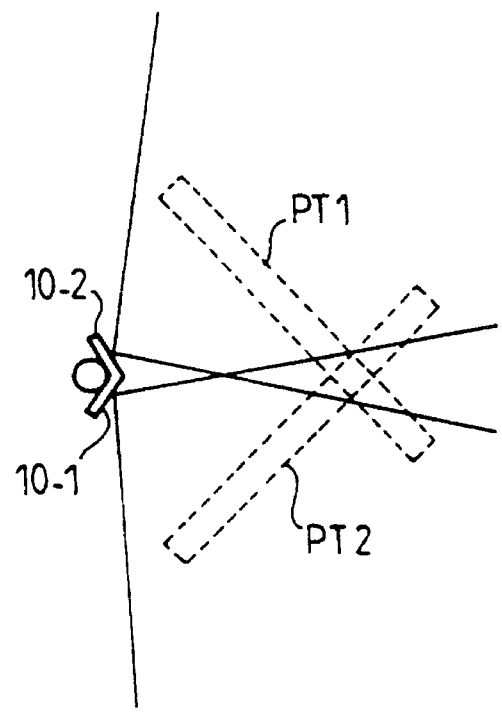
Figure 9:
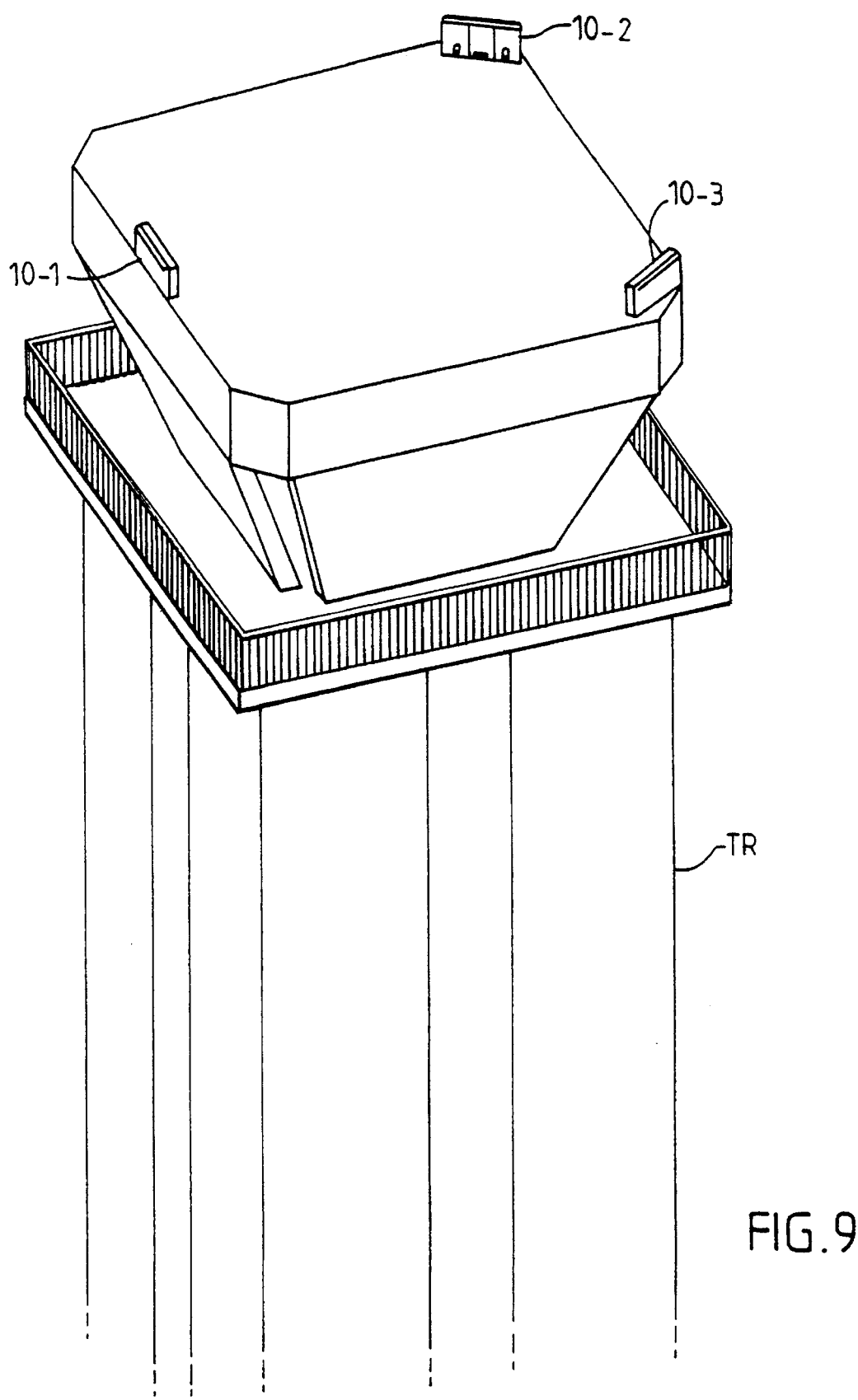
FIG. 9 illustrates a way of setting up three fixed antennas.

In FIGS. 7 to 9, the radar installation according to the invention comprises two or three fixed antennas 10-1 to 10-3 each associated with an outside assembly EE1 to EE3 and with a common processing bay BT. This configuration with five blocks EE1, EE2, EE3, BT and, if appropriate, EV finds an advantageous application to airports with at least two runways PT1 and PT2 laid out crosswise.

Figure 10A:
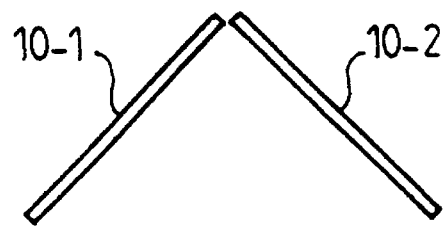
FIGS. 10A and 10B are two other layout diagrams of multiple fixed antennas according to the invention.
Figure 10B:
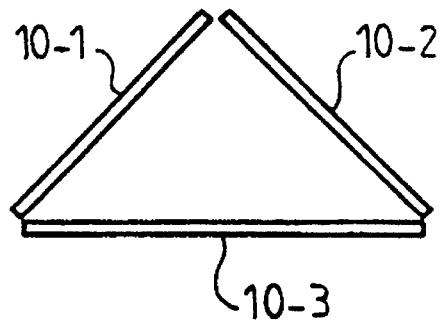

With reference to FIGS. 10A and 10B, the multiple antennas allow coverage in bearing of a larger angle, for example up to 300° with two antennas 10-1 and 10-2 or 360° and more with three antennas 10-1 to 10-3.

Figure 11:
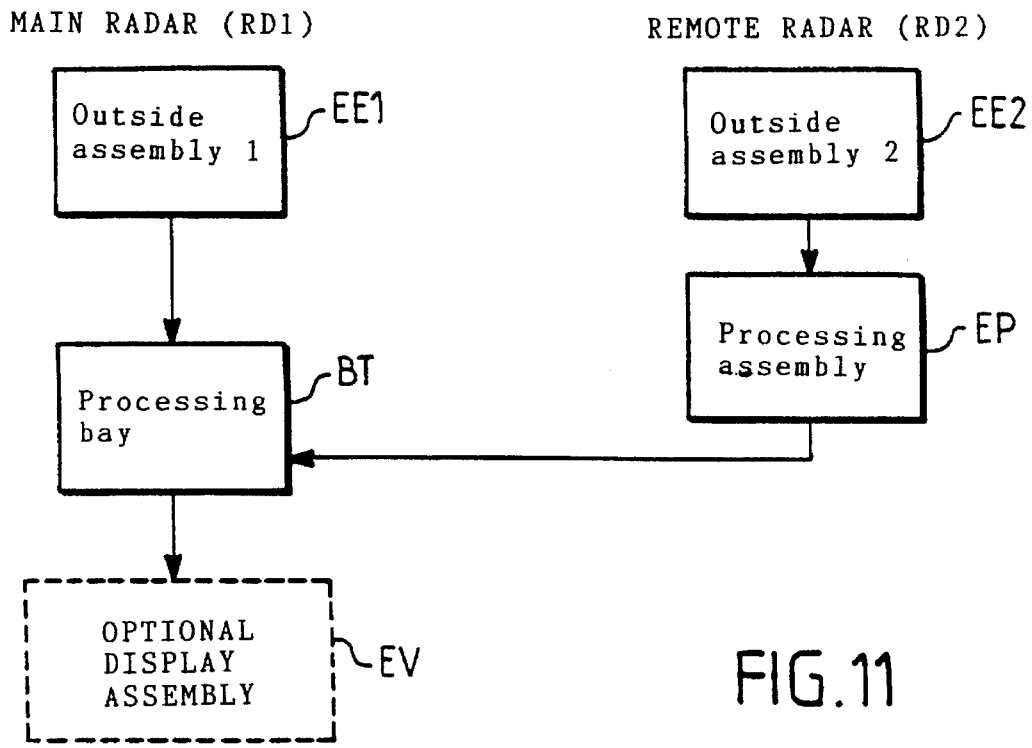
FIG. 11 represents diagrammatically an installation comprising a main radar and a remote radar according to the invention.
Figure 12:
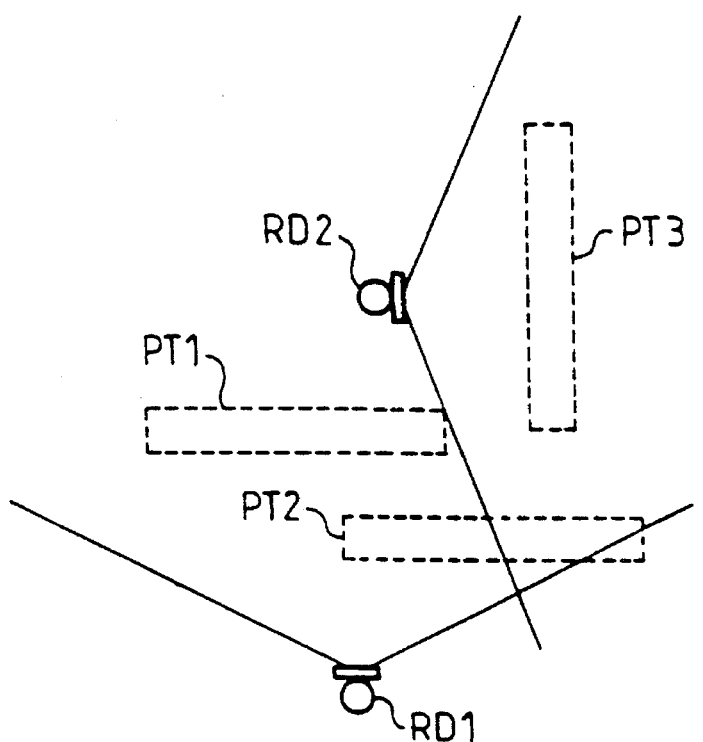
FIG. 12 is a layout diagram of the main and remote radars of FIG. 11.

Furthermore (FIGS. 11 and 12), for large airports comprising for example two mutually parallel runways PT1 and PT2 and a third runway PT3 perpendicular to them, it is expedient to use a main radar RD1 having the aforementioned blocks EE1, BT and EV (FIG. 3), and furthermore, a remote radar RD2 possessing a preprocessing assembly EP connected to the common processing bay BT so as to relay thereto the information emanating from the outside assembly EE2. One part at least of the processing facilities is grouped together at BT.

Of course, the main radar RD1 and the remote radar RD2 can each comprise several fixed antennas, as appropriate.

Figure 18:
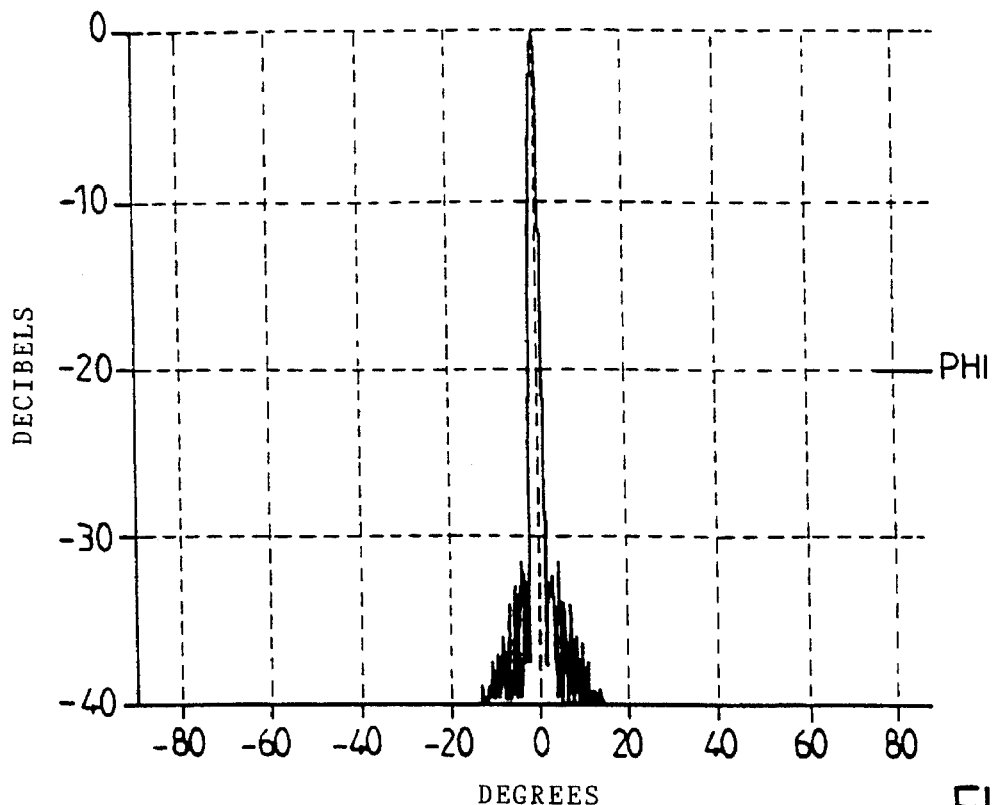
Figure 19:
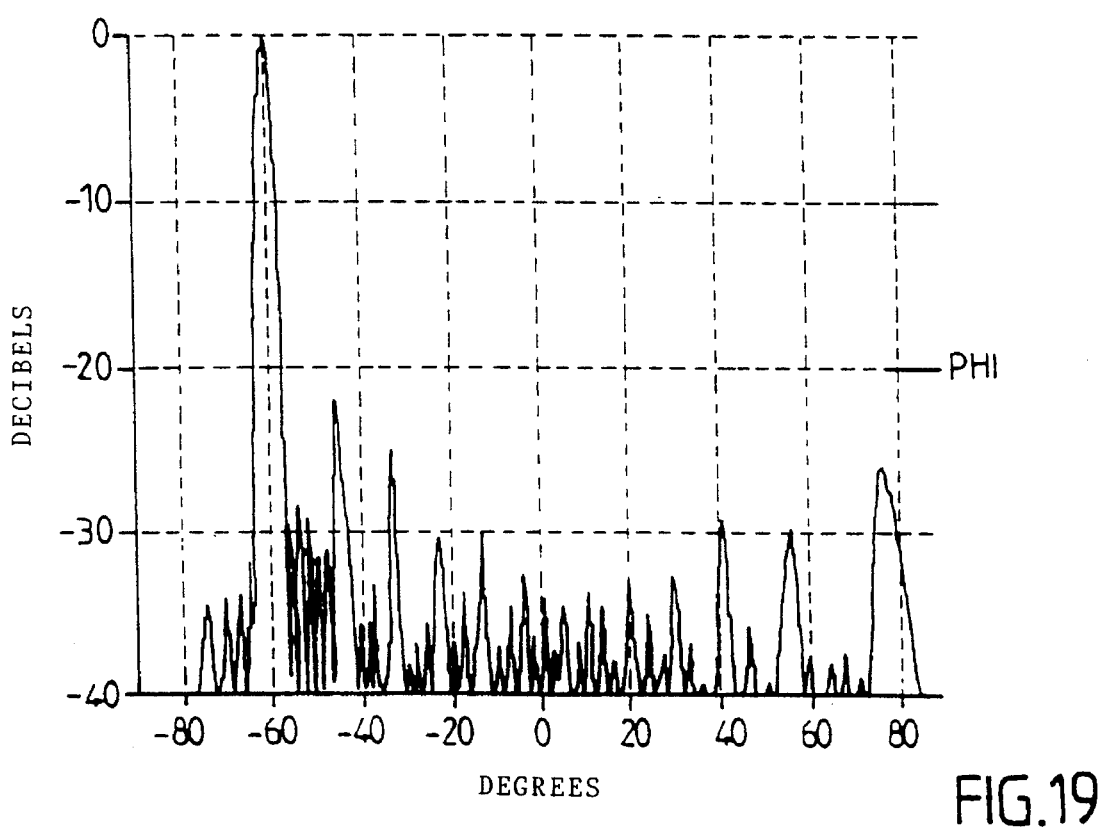

The antenna gain lobe diagram exhibits a beam having an aperture of the order of 1.5° in azimuth along the axis (at 0°, FIG. 18), and 3° for 60° shift in aiming (FIG. 19).

Figure 13:
FIG. 13 illustrates diagrammatically the gain and the lobe diagram in elevation of the radar according to the invention.
Figure 20:
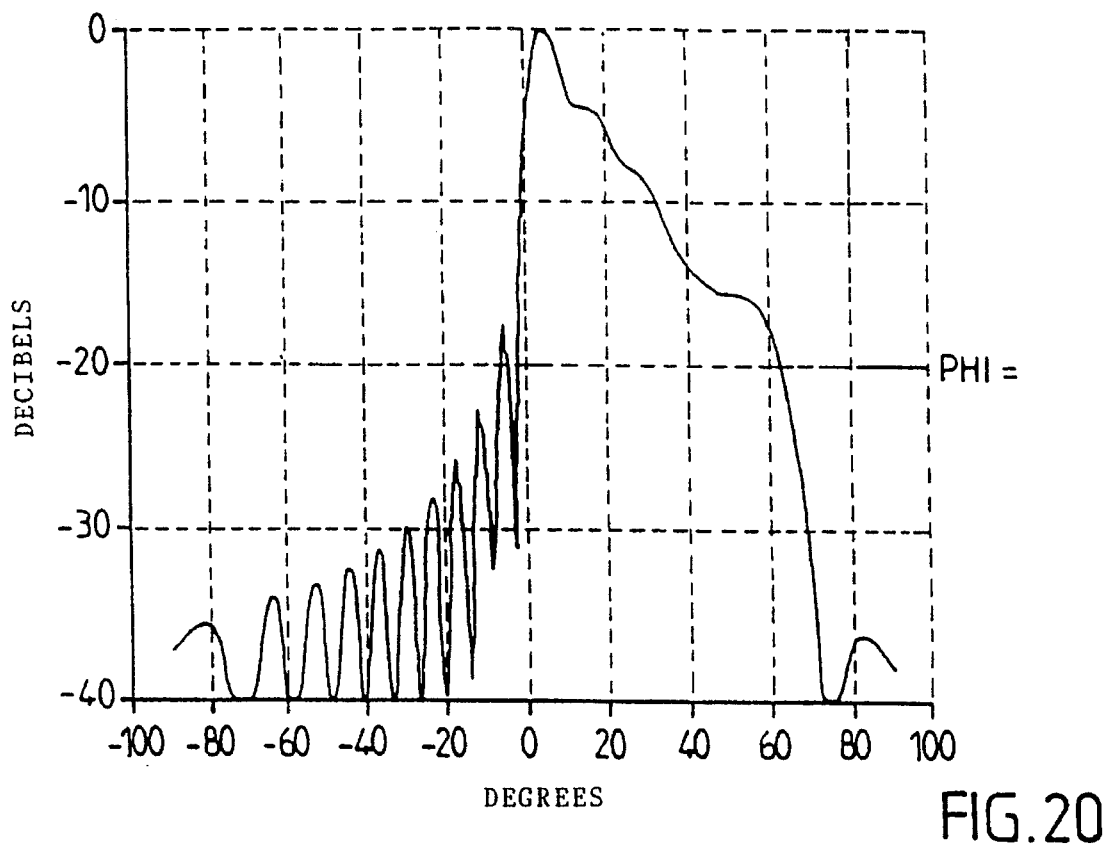
FIGS. 20 and 21 are response diagrams in elevation, obtained according to the invention.

The elevation gain lobe diagram is a lobe of inverse cosecant squared type, that is to say substantially tangential to the horizontal so as to allow detection of aircraft in flight (FIGS. 13 and 20, enlarged in 21).

The antenna gain is of the order of 30 dB for the detection of objects with RCS (radar cross section) of 1 m².

The magnitude of the side lobes precludes the detection of obstacles with large RCS in azimuth and of clouds in positive elevation. The magnitude of the first side lobes with respect to the main lobe is about −25 dB in azimuth and −20 dB in elevation.

Figure 14:
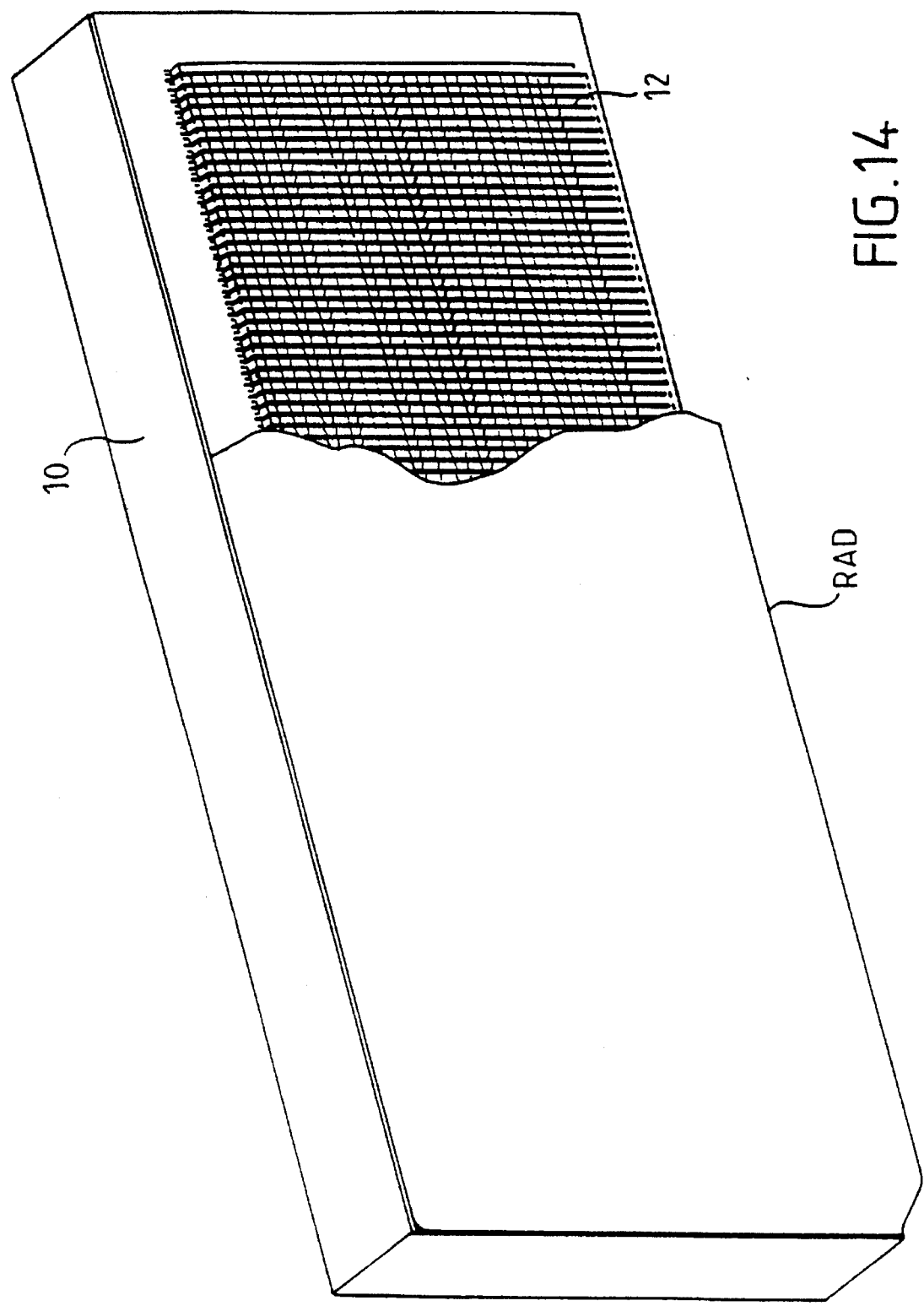
FIG. 14 is a front perspective view of a fixed antenna according to the invention.

The dimensions of the antenna are of the order of 1.50 m×0.60 m. FIG. 14 shows the fixed antenna 10 equipped with its radome RAD. This is a rectangular plane radiating surface consisting for example of 96 radiating elements of a slot guide type.

Figure 15:
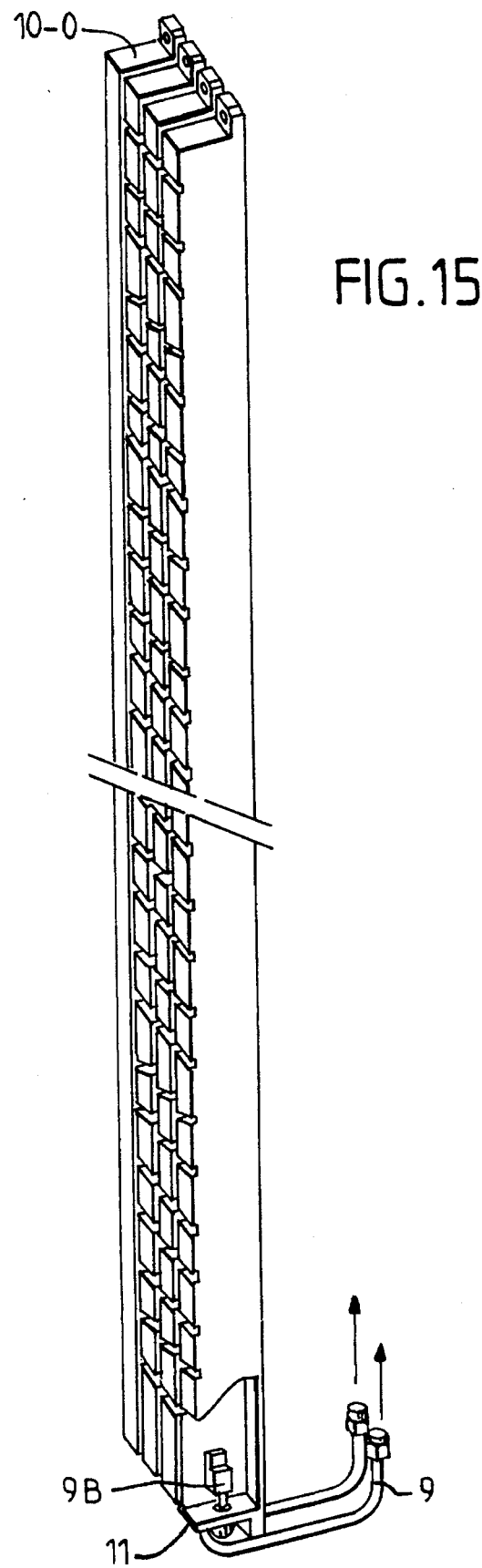
FIG. 15 is a partial perspective view of the antenna of FIG. 14, showing its feed link.
Figure 16:
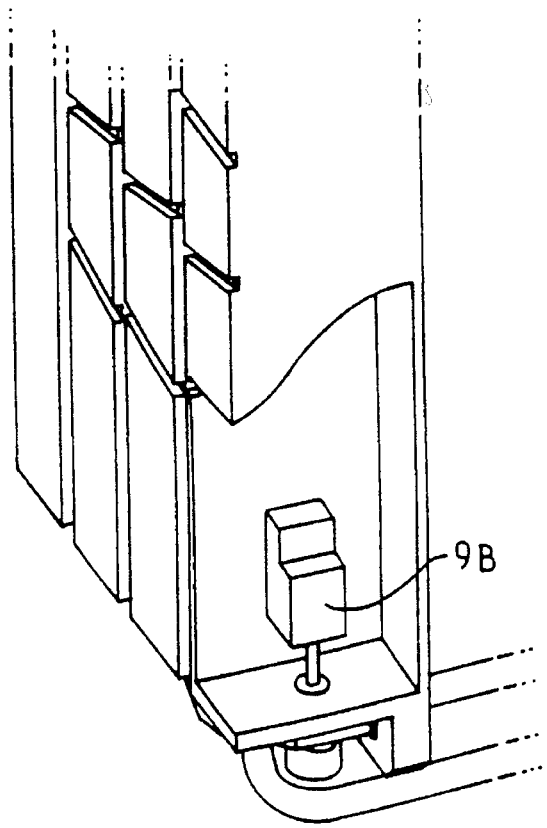
FIG. 16 is a detailed part of FIG. 15.

With reference to FIG. 15, each guide is fed at its lower end 11 through a junction 9 of the waveguide/coaxial cable type, with the exception of the end waveguide 10-0 which is not fed. A longitudinal waveguide/coaxial transition 9B feeds each column (FIG. 16), except for the endmost ones.

Each fed waveguide operates in resonant mode. The power is tapped off at regular intervals through slots cut out in the small side, so as to obtain the desired phase law.

Figure 17:
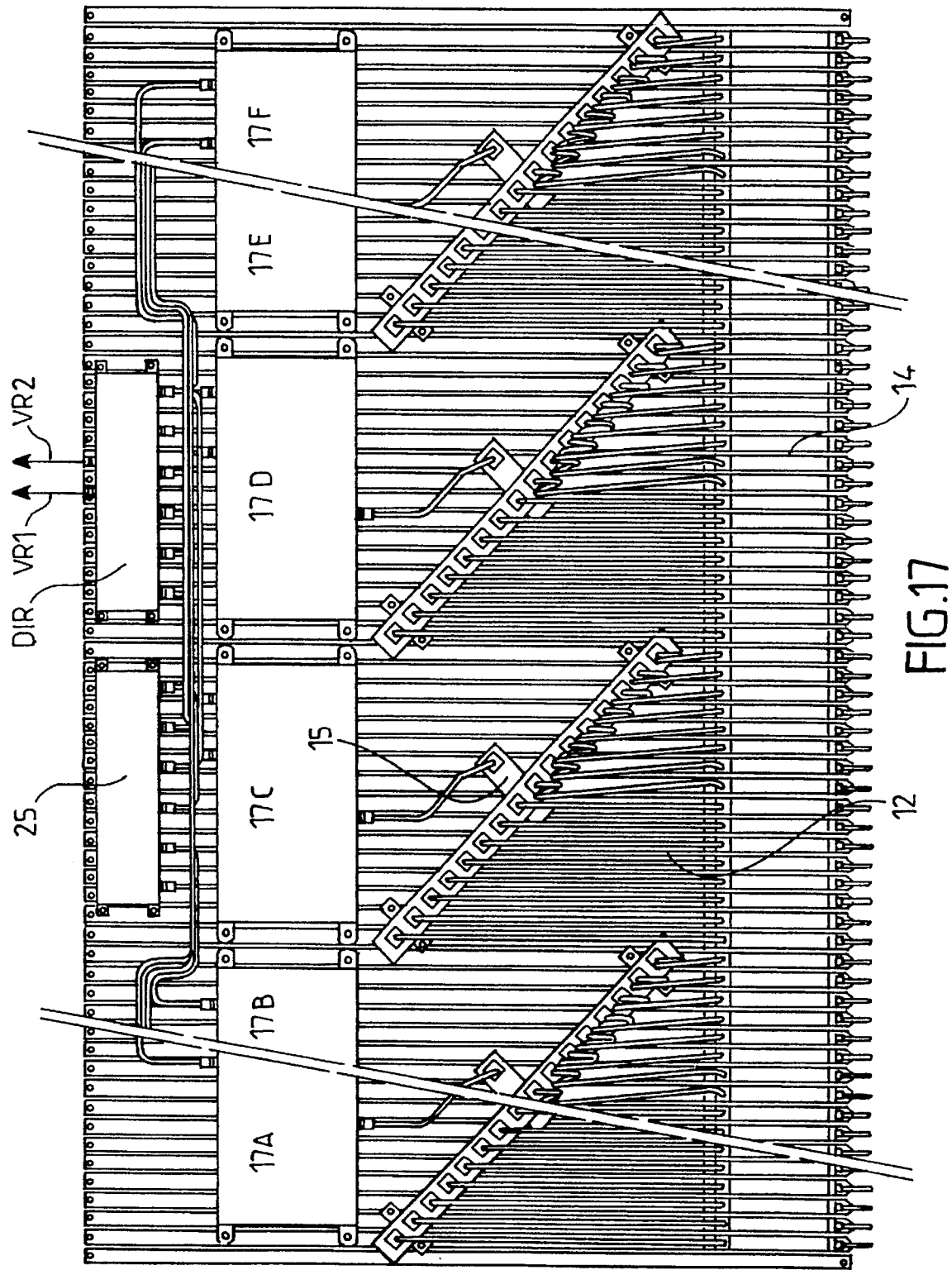
FIG. 17 is a rear view of the radiating panel of the fixed antenna of FIG. 15, FIGS. 18 and 19 are response diagrams in relation to bearing, obtained according to the invention.

FIG. 17 shows the way in which the distributors 15 described with reference to FIG. 1 are affixed to the rear face of the radiating panel, subdivided into 6 subassemblies each of 16 waveguides. Each waveguide has its controlled phase shifter 14. Each module 17A to 17F is associated with one of the 6 subassemblies.

By symmetry, the unit DIR provides the first and second receive channels VR1 and VR2 (received microwave frequency signal).

The low-loss plane radome RAD is for example of the sandwich type consisting of a quarter-wave layer of dielectric foam captured between two thin layers of resin glass. It is held a few centimeters from the radiating panel so that its presence should not directly disturb the radio-frequency characteristics of the radiating elements.

A commercial circulating air-conditioning device (not represented) suffices to ensure the maintenance of an acceptable temperature inside the thus formed enclosure as well as the possible de-icing of the radome.

The assembly forming the antenna is fixed on a mechanical holding structure.

The antenna is designed so as to produce a shaped diagram in the elevation plane (of the cosecant squared type) and a diagram of the narrow beam type ("pencil beam") which can be steered electronically over ±75° in the bearing plane.

The transmission divider 25 can be a low-level divider constructed by triplate technology and consisting of a cascade of hybrids ensuring the proper initial power split between the 6 groups of 16 radiating waveguides.

The splitter 15 consists of stretches of resonant guides fed at the centre via crossed couplers. The power is tapped off via electrical probes of variable depth. Such a splitter 15 has the advantage of exhibiting little loss.

Of course, other splitters and radiating and phase-shifter elements may be envisaged.

As regards the receiving summation unit DIR, this is a splitter of the same kind as the transmission divider 15. It consists of two summation units with factor 3 connected to the two lateral arms of a hybrid junction ("magic T") providing the sum channel VR1 and difference channel VR2.

The connection lines are provided by flexible or semi-rigid coaxial cables. Although the electronic phase shifters 14 may be used to correct for the differential phase errors between the channels, it is desirable for cables of the same kind to have the same electrical length so as to simplify the factory calibration operations. It is desirable to obtain equiphase splitting at the input of the phase shifters, to within one LSB (least significant bit) of the latter.

The shape of the diagram in the elevation plane (FIG. 13) depends on the particular illumination law (formula L1 in the appendix) depicted along each guide by its radiating slots. In formula L1, y is the ordinate along the column, A an amplitude parameter, and $\Phi$ the phase.

The inside of the guide is the nucleus for a standing wave. The slots are located every (guided) half-wavelength, over the maximum interior electric field.

The geometric characteristics assigned to each slot (inclination, length) impart to the latter a particular characteristic in terms of amplitude and phase, for transferring from the inside to the outside of the guide and thus making it possible to depict the desired illumination law given by formula L2 in the appendix, where f is the index of the slot, $E_i$ the electric field inside the guide, and T(f) the transfer function of the slot, whilst $E_r(f)$ denotes the field radiated by the slot.

The formation of the narrow beam in bearing is achieved by superimposing on the previous law L2 a conventional equiphase and weighted amplitude illumination law. This is ensured for example by the transmission divider 25 and the 6 waveguide splitters 15 situated on the rear face of the antenna.

Lastly, the steering of the beam in the bearing plane is achieved by superimposing on the previous laws a variable linear phase law given by formula L3 in the appendix, where x is the abscissa along the antenna, $\Theta$ the desired angle of deflection, and K a parameter which those skilled in the art may determine.

This phase law L3 is controlled by the 96 phase-shifter elements situated upstream of the 96 radiating elements.

The transmit/receive duplexing is performed in the six transmit/receive modules described earlier with reference to FIGS. 1 and 2.

The operating frequency of the antenna is advantageously in the X band with a variation of ±75 MHz around the chosen central frequency.

The gain is of the order of 30 dB with 0° off-radome shift in aiming, and greater than 26 dB with a ±60° shift in aiming, likewise off-radome.

The loss from the radome RAD is less than 1 dB.

Represented in FIGS. 18 and 19 is the response diagram in the bearing plane, at 0° deflection (FIG. 18) and at 60° deflection (FIG. 19).

The deflection in bearing is advantageously controlled by 4-bit phase shifters. The rise in the deflection side lobes is essentially due to the quantization of the phase, this being penalizing to linear arrays.

Figure 21:
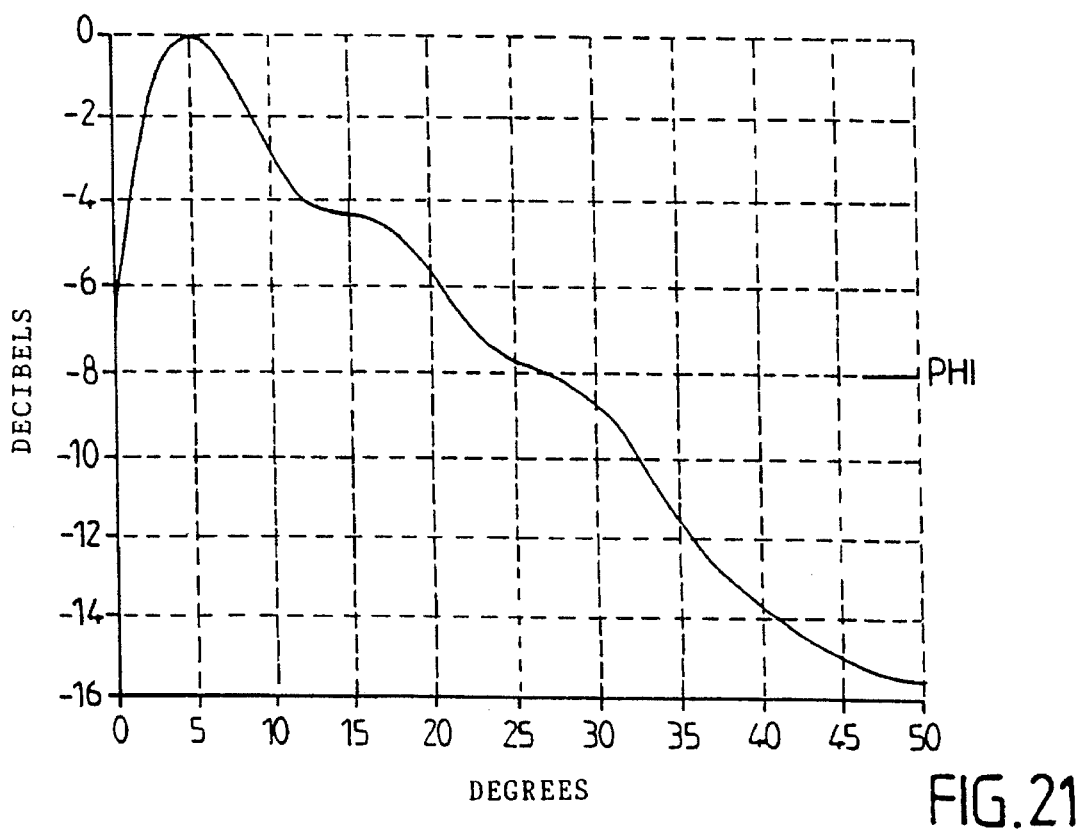

Represented in FIG. 20 is the response diagram in the elevation plane, and represented in FIG. 21 is a partial enlarged view of the response diagram of FIG. 20.

Figure 22:
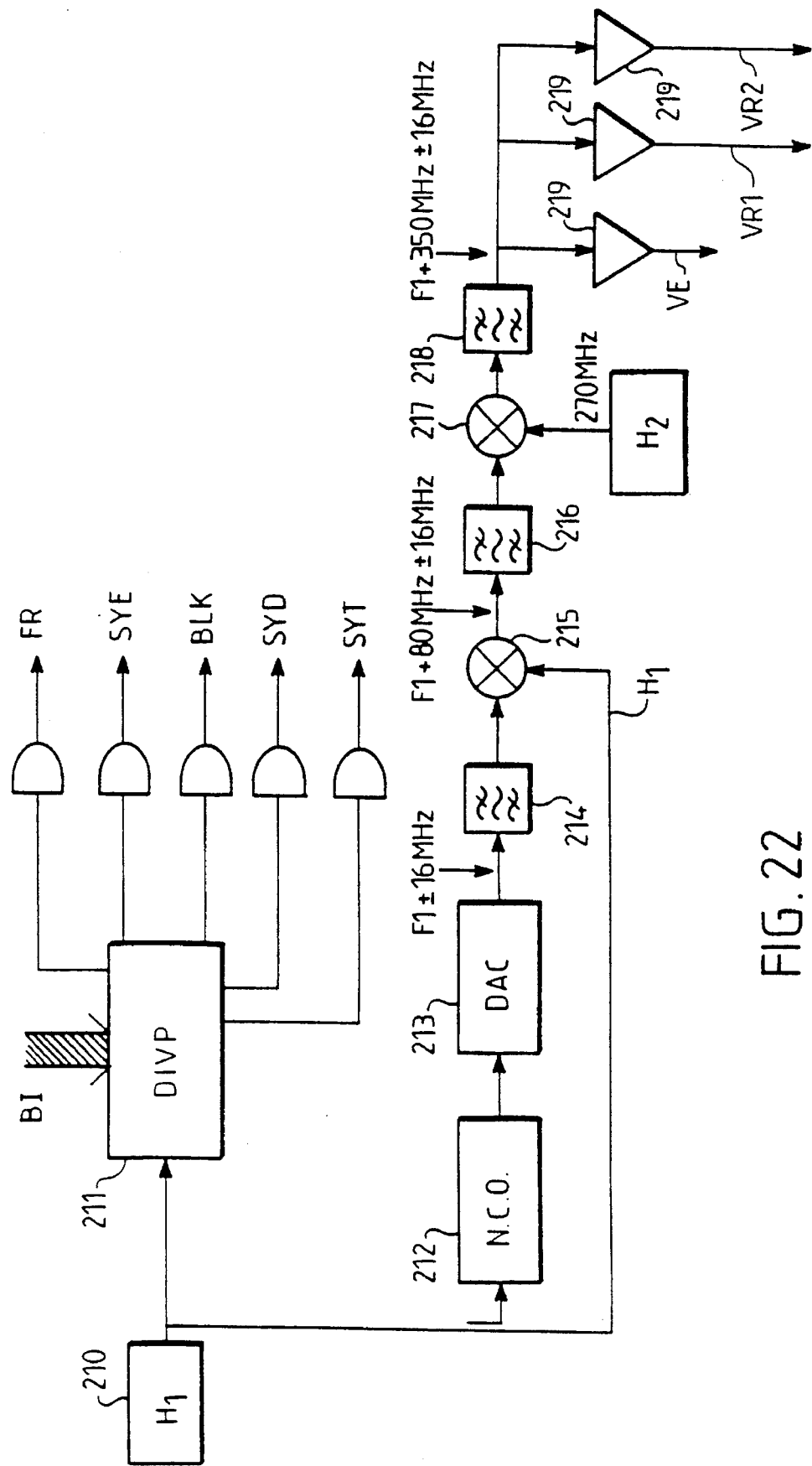
FIG. 22 is a block diagram of the frequency synthesizer means according to the invention.

With reference to FIG. 22, the assembly of elements forming the frequency synthesizer is grouped together on a board embracing the following:

an 80 MHz base clock 210 or H1;

a programmable divider DIVP or 211 which gives signals synchronous with the repetition frequency RF, transmission synchronization SYE, a receiver blanking control signal BLK, processing synchronization SYT and phase-shifter synchronization SYD. This programmable divider DIVP is controlled by the central computer (not represented) via the internal bus BI.

The elements forming the synthesizer means consist of commercially available integrated circuits.

For example, there is an element 212 or NCO (Numerical Control Oscillator) of the STEL type, sold under the reference 1176 by FREQUENCY SYNTHESIS PRODUCT. Its output is applied to an analog/digital converter 213 or DAC (digital/analog converter) of AD9712B type, sold by the company ANALOG DEVICES, the output of which is F1±16 MHz. After filtering 214 and mixing at 215 with the clock signal H1, we obtain F1±16 MHz+80 MHz. A new filtering stage 216 is followed by mixing stage 217 with the 270 MHz clock signal H2 and by a last filtering stage 218, which gives signal F1±16 MHz+350 MHz. Three outputs 219 feed this latter signal to the two receive channels as coherent demodulation frequency, and correlatively to the microwave frequency source 16 (FIG. 1) as modulation frequency.

This digital frequency synthesizer delivers, in tempo with the clock signal H1, samples of a sinusoidal signal with a resolution of 12 bits, thus making it possible to deliver signals with a high accuracy in frequency of better than a few Hz and a spectral purity of the order of −80 dB per Hz in a band spanning from 0 to 32 MHz.

The frequency synthesizer means are dimensioned so as to provide 16 transmission frequencies whilst remaining synchronous in terms of phase. They also deliver the intermediate-frequency demodulation signals.

The frequency of the signals is controlled by a central computer via the internal bus BI and a digital interface (not represented).

Signals from the DAC consist of trains of 16 frequencies with an increment of 2 MHz each within a band F1 of the order of 16 MHz plus or minus.

The frequency F1 varies with the Doppler filtering period during which the repetition frequency RF remains constant.

When the frequency RF varies, there is provision to adjust the frequency F1 so that the intermediate frequency IF remains an integral multiple of the frequency RF.

This enables certain parasitic signals to be circumvented.

Lastly, the mixers or transposition circuits are produced via a double frequency change so as to be associated with analog filterings within a band of 32 MHz.

The intermediate frequency IF is chosen of the order of 400 MHz so as to avoid corruption by surrounding VHF transmissions.

Figure 23:
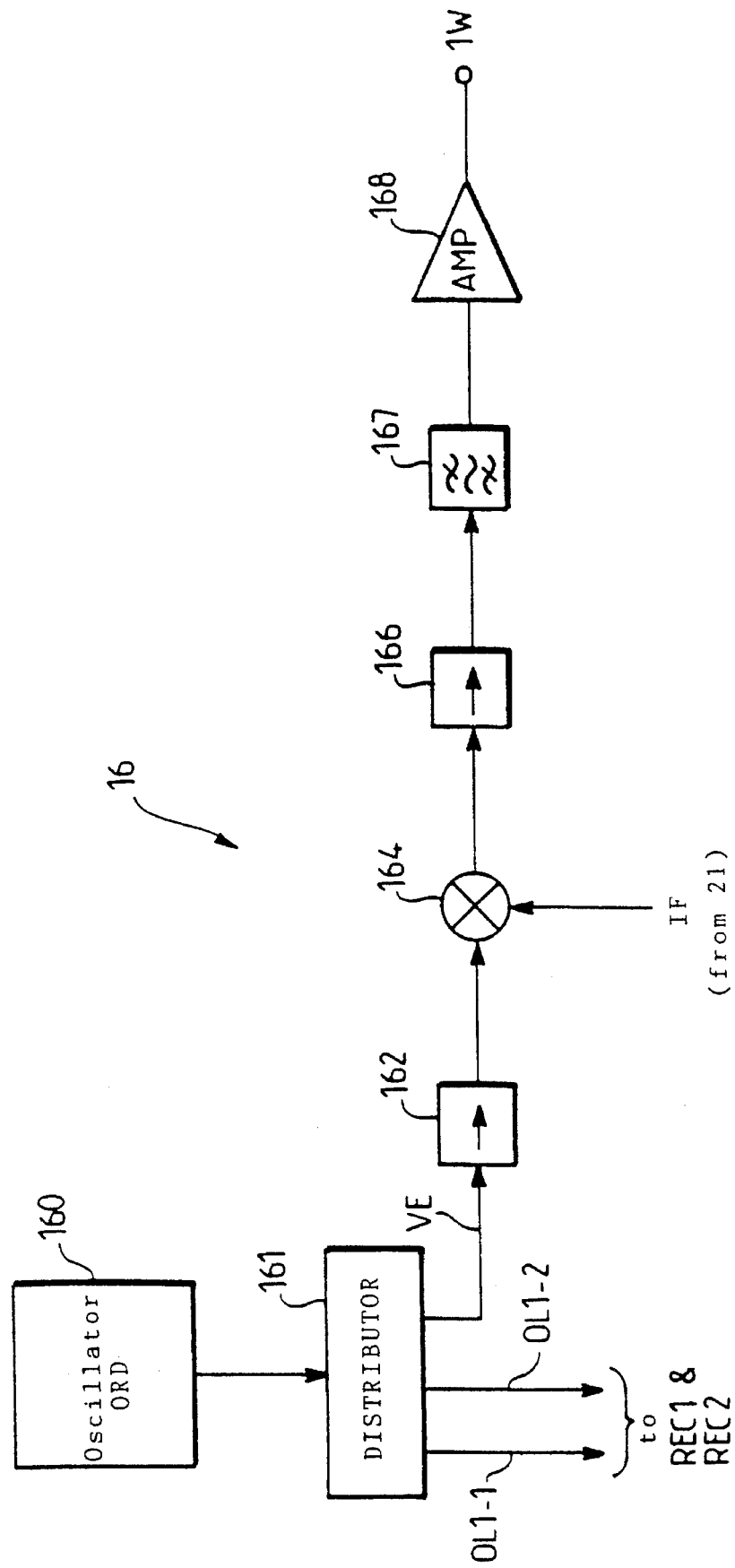
FIG. 23 is a block diagram of a transmit source according to the invention.

With reference to FIG. 23, the microwave frequency source 16 engenders transmission signals in a coherent manner from an X-band single reference oscillator 160 or ORD which can be set over a 50 MHz bracket.

A power divider 161 or DISTR distributes the signal to the transmit channel on the one hand and in parallel to the two receivers REC1 and REC2 for demodulation of the microwave signal.

In the transmit channel VE, the microwave signal passes through the non-return 162 so as to be mixed at 164 with a signal with intermediate frequency IF ±16 MHz originating from the frequency synthesizer.

After another non-return 166, matched filtering 167 eliminates the image frequency and the parasitic lines from the band.

Lastly, a medium-power amplifier 168 or AMP carries the signal to a magnitude of about 30 dB (1 watt).

The pilot signal is thus obtained directly in the X band from a dielectric resonance oscillator whose characteristics, in terms of frequency stability and spectral purity, are compatible with the application considered here.

In the embodiment described, the main characteristics of the dielectric resonator oscillator are the following:

an operating frequency in the X band, a mechanical frequency setting of ±25 MHz;

an output power of the order of 20 dBm at 100 mW;

an all-service maximum frequency precision of the order of ±1 MHz;

a magnitude of the harmonic lines of the order of −20 dBc;

a magnitude of the parasitic lines of the order of −60 dBc;

a phase noise in single band for 10 kHz of the carrier of the order of −90 dBc per Hz and for 100 kHz of the carrier of the order of −115 dBc per Hz.

Several solutions may be envisaged with regard to transmission when the cost reliability constraints are taken into account. The search for a high MTBF in relation to the transmitter leads to the search for a low peak power. Indeed, the MTBF of low-power tubes is higher and calls upon lower supply voltages, this being reflected in increased reliability.

Given the possible processing and the magnitude of the signal-to-noise ratio required, the peak power is fixed at about 100 W for a mean power of the order of 1 to 2 W.

With this magnitude of radiated power, the radar has the advantage of being scarcely a parasitic influence on other systems.

According to FIG. 1, the transmission amplification is solid-state.

Figure 31:
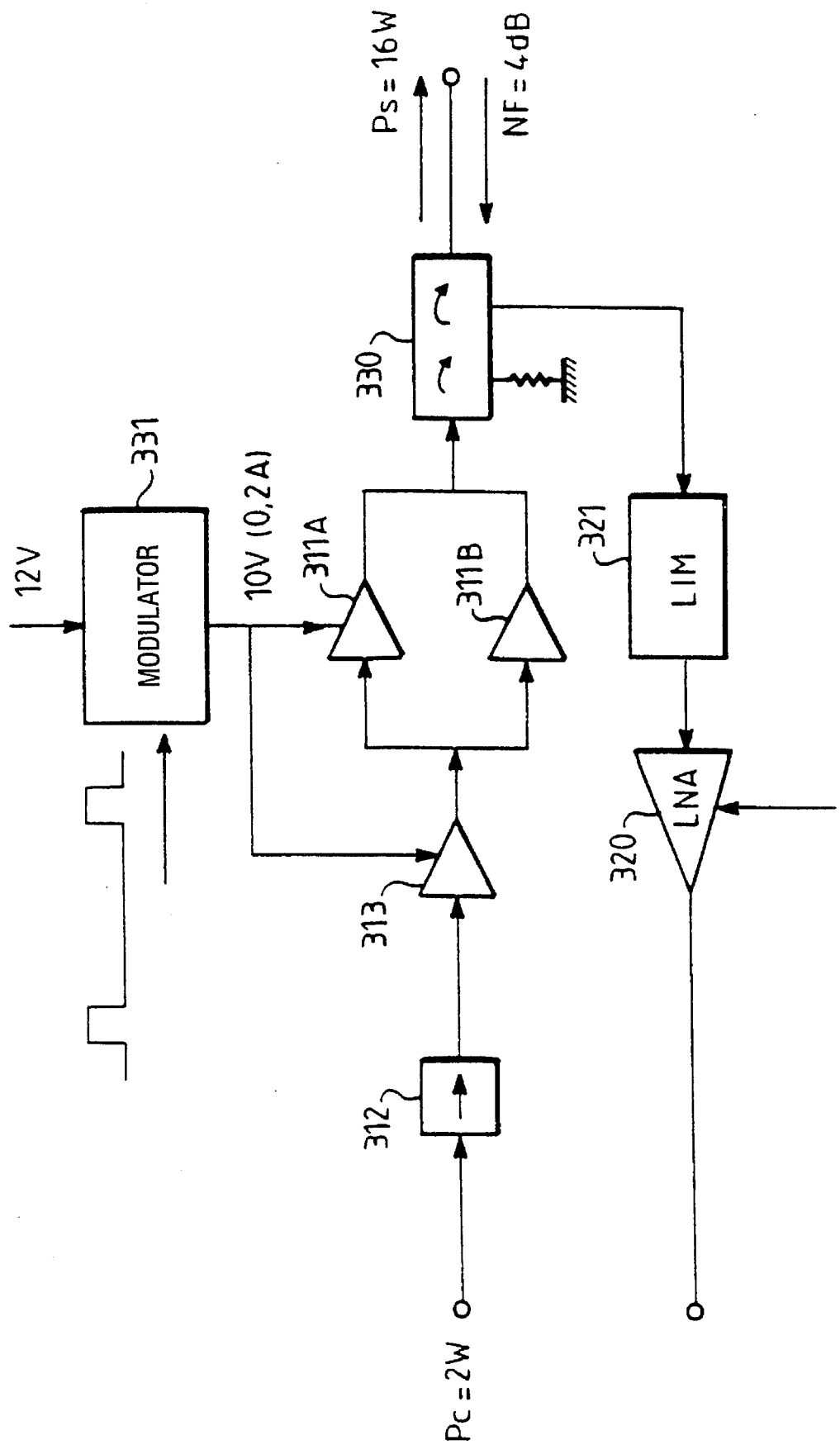
FIG. 31 is a logic diagram of a solid-state transmit/receive module according to the invention.

In this case (FIG. 31), each module comprises a power amplifier for transmission (311 A and B). The power amplifier receives a signal of about 3 dBw (2 W) at its input, via a non-return 312 and a preamplifier 313 (the elements 311, 312 and 313 are parts of block 3—FIG. 1). It outputs a power of 12 dB (16 W), through the circulator 330 (reference 20 in FIG. 1). The power amplifier uses two stages with AsGa power transistor TEC. The last stage requires the paralleling of two transistors. The supply voltage for the two stages is pulse modulated (331) so as to reduce thermal dissipation and improve the reliability of the assembly.

The output of the circulator is coupled by a limiter 321 (protection against parasitic signals of high magnitude and diverse origin) to a low-noise amplifier 320 (5 in FIG. 1), blocked during transmission.

The role of the low-noise amplifier, in view of its gain and self-noise factor, is to optimize the sensitivity in reception by rendering negligible the contribution of the losses which are introduced behind it. The noise factor measured at the input of a transmit/receive module, including the losses from the limiter and from the circulator, is about 4 dB.

Figure 24:
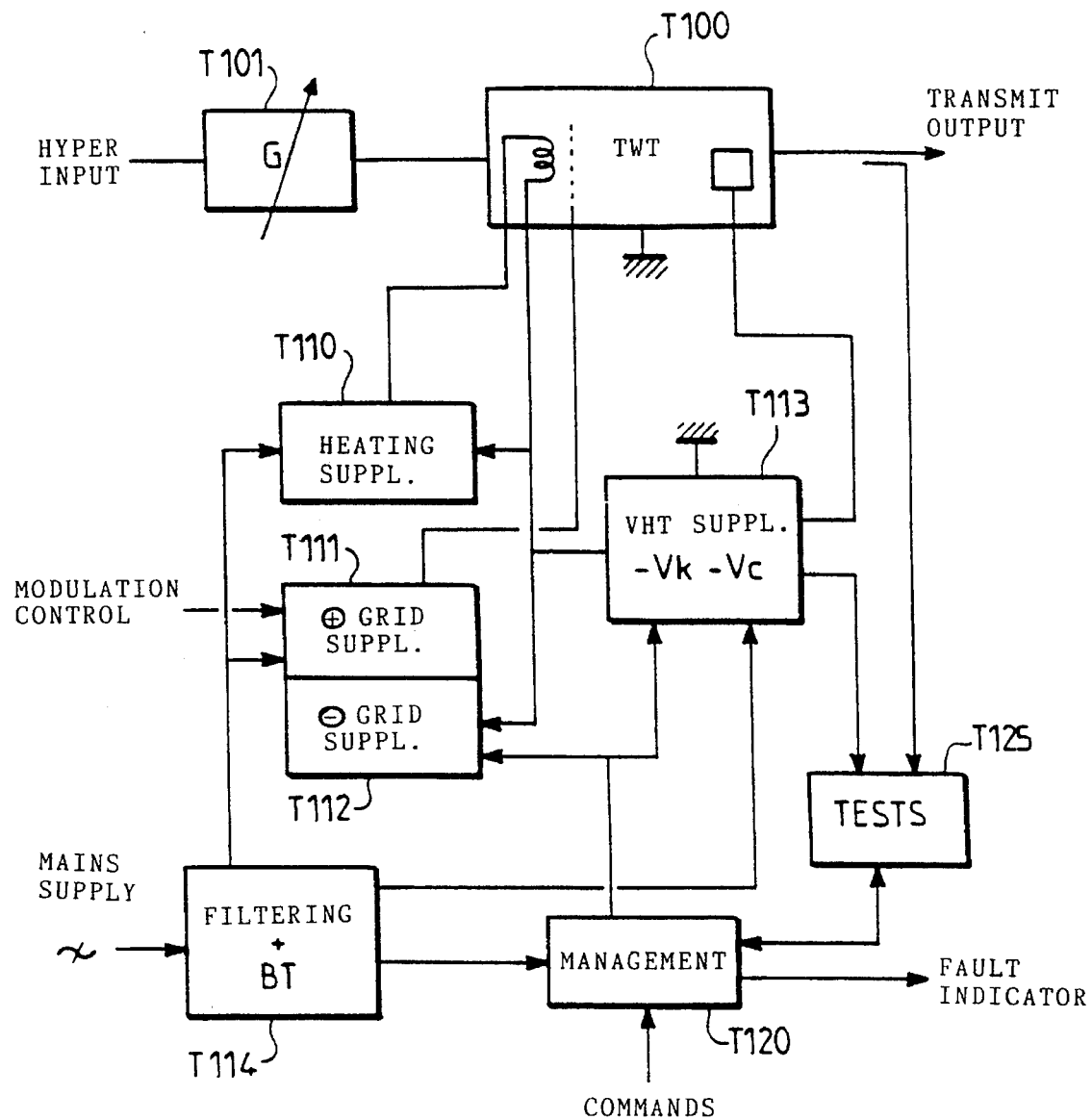
FIG. 24 is a block diagram of a travelling wave tube used as centralized transmitter according to a variant of the invention.

As described with reference to FIG. 3, the transmit/receive module can be envisaged according to a class said to have a transmitter with centralized tube of the travelling wave tube type (FIG. 24), magnetron, etc., or else of the solid state transmitter type.

The TWT T100 is furnished with its variable-gain input T101 and with its customary supplies T110 to T114. Management stage T120 and control of modulation pertain to the grid supplies T111, T112 and Very High Voltage supply T113. A test unit, coupled to the output of the TWT, is provided at T125.

In this case of a centralized transmitter, a travelling wave tube with synchronized magnetron or with mini CFA, that is to say Cross Field Amplifier, may be used.

These variants each use an amplifier tube, resulting in a preheating time constraint, vulnerability of the tube's cathode/filament pair and use of the very high voltage, with a risk of lower reliability of the components.

In the case of a transmitter with travelling wave tube, a grid tube is required in order to produce the desired waveform.

The spectral quality of the output signal is directly related to that of the input signal, and to the quality of the heating supplies for the cathode and collector grids resulting in the need to obtain very low magnitudes of noise and parasitic lines with regard to these parameters.

All these supplies are monitored in terms of voltage and current so as to maintain the travelling wave tube within its operating bracket for fear of deterioration.

In the case of a transmitter with synchronized magnetron or CFA, the microwave frequency bracket is more restricted, whilst the reliability and constraints of use are of the same order.

Generally, the X band source is mechanically tuneable, for example over 50 MHz which allows the use of a remote radar on different frequencies so as to avoid any mutual parasitic influence.

Figure 29:
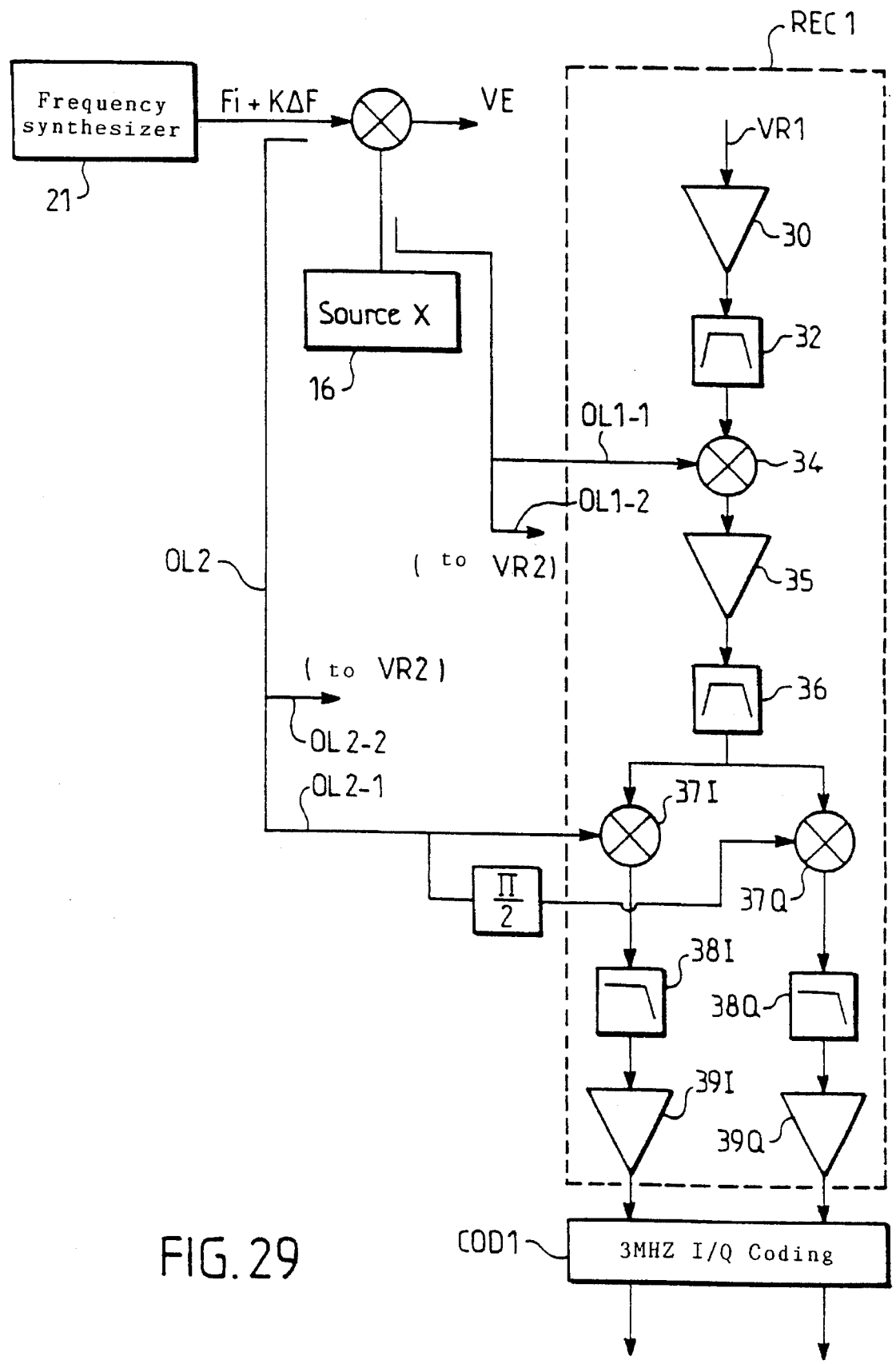
FIGS. 29 and 30 illustrate differently the frequency change, the demodulation, and the coding in a receiver element.
Figure 30:
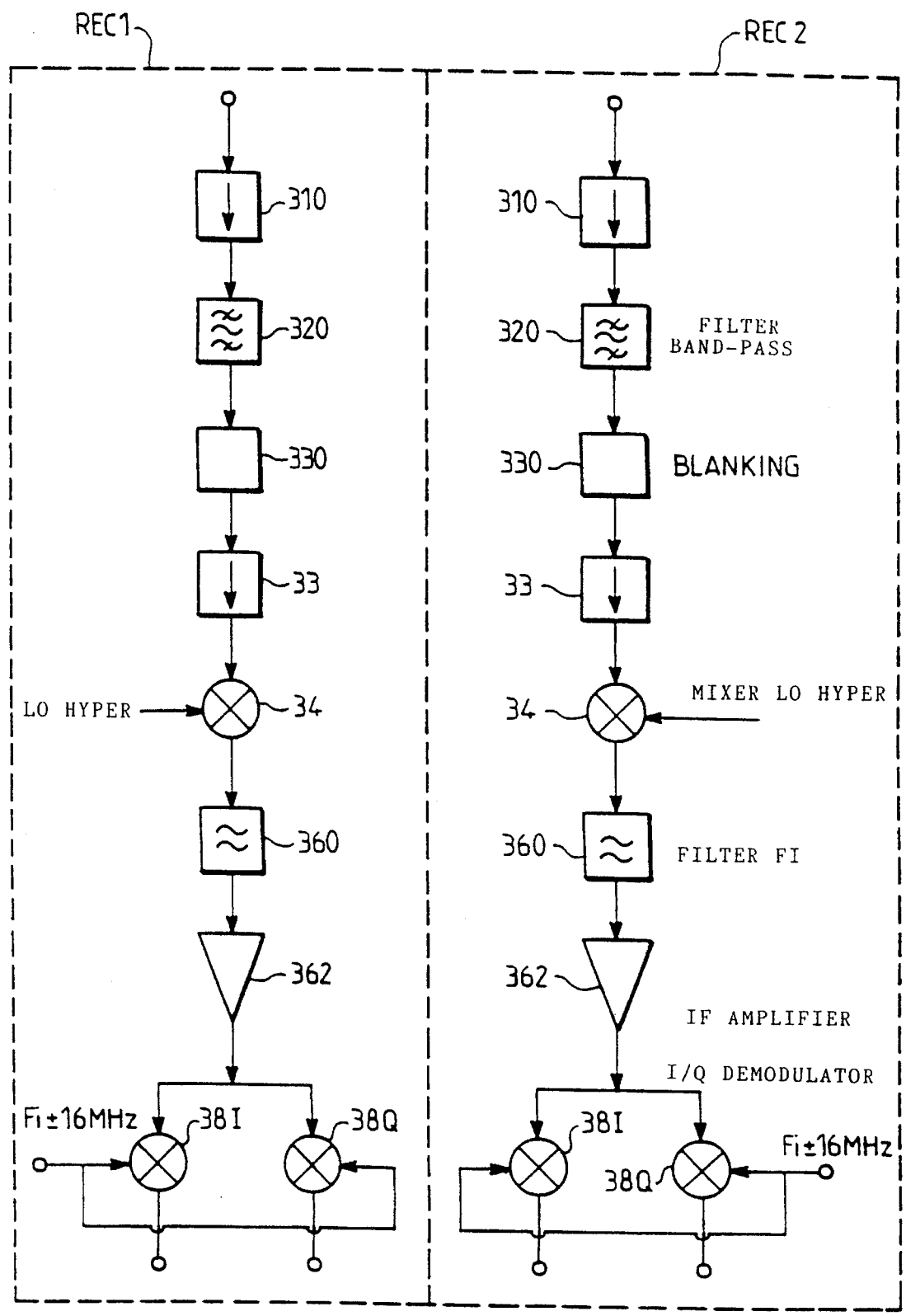

Two-channel reception is now considered, with reference to FIG. 29, which details one channel, and FIG. 30 which shows both.

After amplification 30 (FIG. 29) and/or non-return 310 (FIG. 30), a first microwave filtering 32 ensures protection from external parasitic influences and parasitic lines of the local oscillator. It covers a band of about 150 MHz.

Preferably, a new disabling during transmission is undertaken at 330, with non-return 33.

The mixer 34 with the local OL1 is followed by amplification 35 and filtering 36 (or the reverse 360, 362).

The filtering in intermediate frequency (395 MHz) is matched to the full band transmitted by the radar (32 MHz).

On the phase demodulation (37I, 38I, 39I) and quadrature (37Q, 38Q, 39Q), pulse-matched filtering is undertaken on the video signal.

The resultant imaginary and real signals are next converted into digital. This digital coding COD1 and COD2 is undertaken at an oversampling frequency of 3 MHz on 12 bits, which corresponds to a dynamic swing greater than 60 dB.

The role of the band-pass filter 32 is to limit the useful band of the receiver and to afford about 20 dB of attenuation at the image frequency, thus eliminating the noise introduced by the microwave amplifier.

The above described receiver thus carries out the demodulation of the signals received by the radar by double frequency transposition.

The processing will now be considered.

The pulse width is of the order of 0.5 µs, which corresponds to a relatively narrow band, 2 MHz at the receiver.

This waveform makes it possible to preserve sufficient sensitivity at the receiver such as to be able to detect aircraft with a small radar cross section RCS.

The corresponding resolution is of the order of 75 m. The range resolution of the radar being obtained by processing, range compression implements linear modulation of the transmission frequency. For example 16 frequencies are used with a spacing $\Delta F$ between them of 2 MHz. The resulting band is 32 MHz, corresponding to a range resolution of about 5 m.

The repetition frequency RF is fixed at 30 kHz so as to offer an unambiguous processed range bracket of about 5 km.

The change of transmission frequency from pulse to pulse makes it possible to circumvent second repetition echo detection problems.

Having performed the range compression cycle, a Doppler coherent integration allows the extraction of the radial speed of the aircraft. This integration is carried out on eight samples arising from the previous processing, namely a resolution of 3.75 m/s in radial speed. Indeed, the Doppler repetition frequency is 1875 Hz (30 kHz: 16). The ambiguity in radial speed is 28 m/s namely ±14 m/s, which is insufficient.

In order to remedy this, a second complete processing cycle according to the invention (compression+Doppler integration) is advantageously performed using a shifted repetition frequency.

Figure 25:
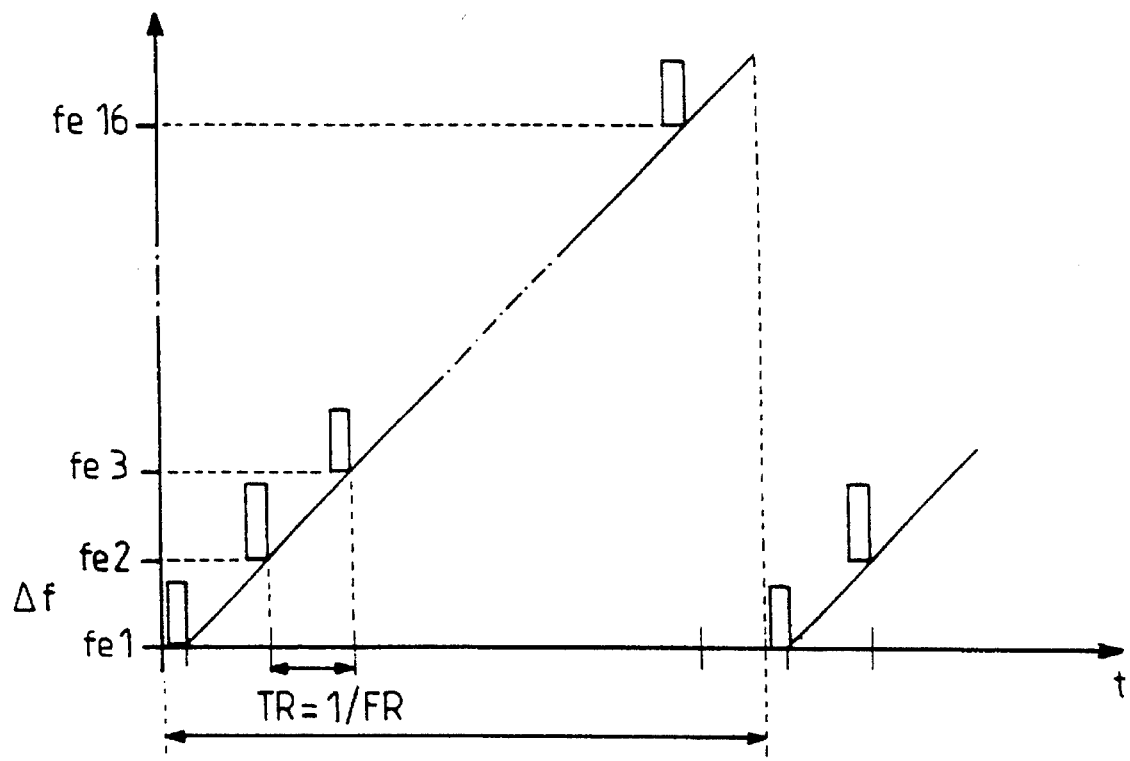
FIG. 25 is a diagram illustrating the linear frequency modulation according to the invention.
Figure 26A:
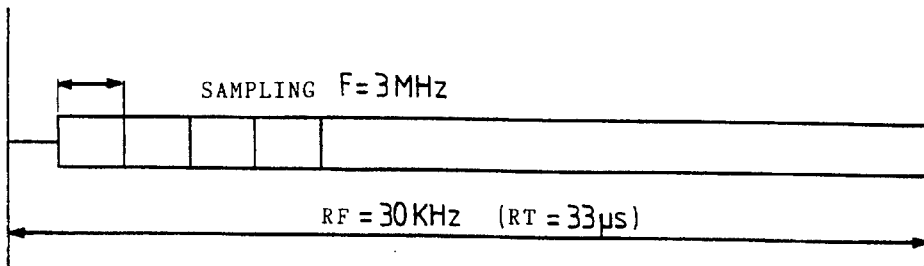
FIGS. 26A to 26D are time charts illustrating a transmit cycle.
Figure 26B:
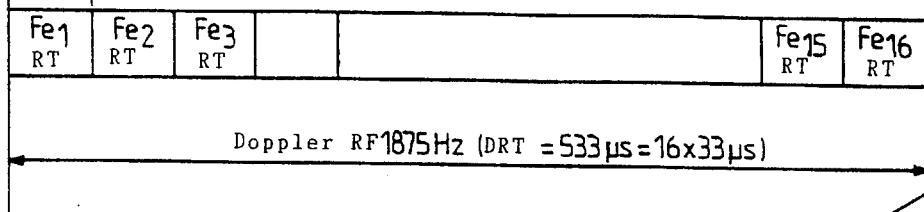
Figure 26C:
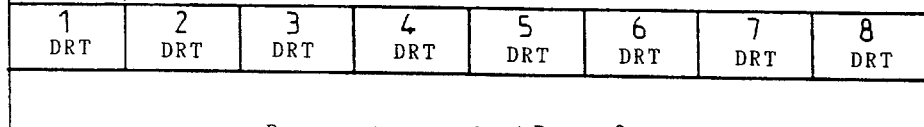
Figure 26D:
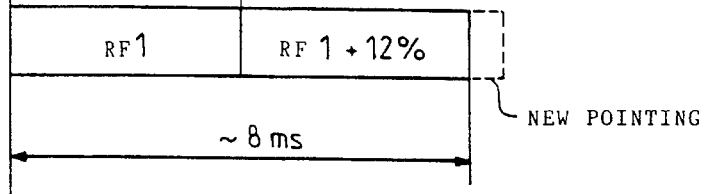

The waveform and the coherent processing exhibit the following characteristics with reference to FIGS. 25 and 26:

a) at the basic repetition frequency (RF=30 kHz, i.e. RT=33 µs), a sampling in range is performed at 3 MHz.

b) this is repeated for the 16 different values of the transmission frequency Fe1 to Fe16 (FIG. 25). This results in a DRF rate of 1875 Hz (for DRT=16 * 33 µs=533 µs).

c) a processing cycle comprises 8 DRT periods and therefore lasts 4.3 ms.

d) all this is repeated for a second value of the basic repetition frequency equal to RF+12% for example.

e) up till here, the phase shifters in bearing have preserved the same setting; this setting is now modified and a restart is made.

The process relating to step b) comprises a fast Fourier transformation (FFT) over 16 points, which provides 16 sub-bins per range bin.

The processing relating to step c) comprises a FFT on 8 points, which provides the conventional integration. Note that as a variant it is possible to use for example 16 DRT periods and a FFT on 16 points.

Figure 28:
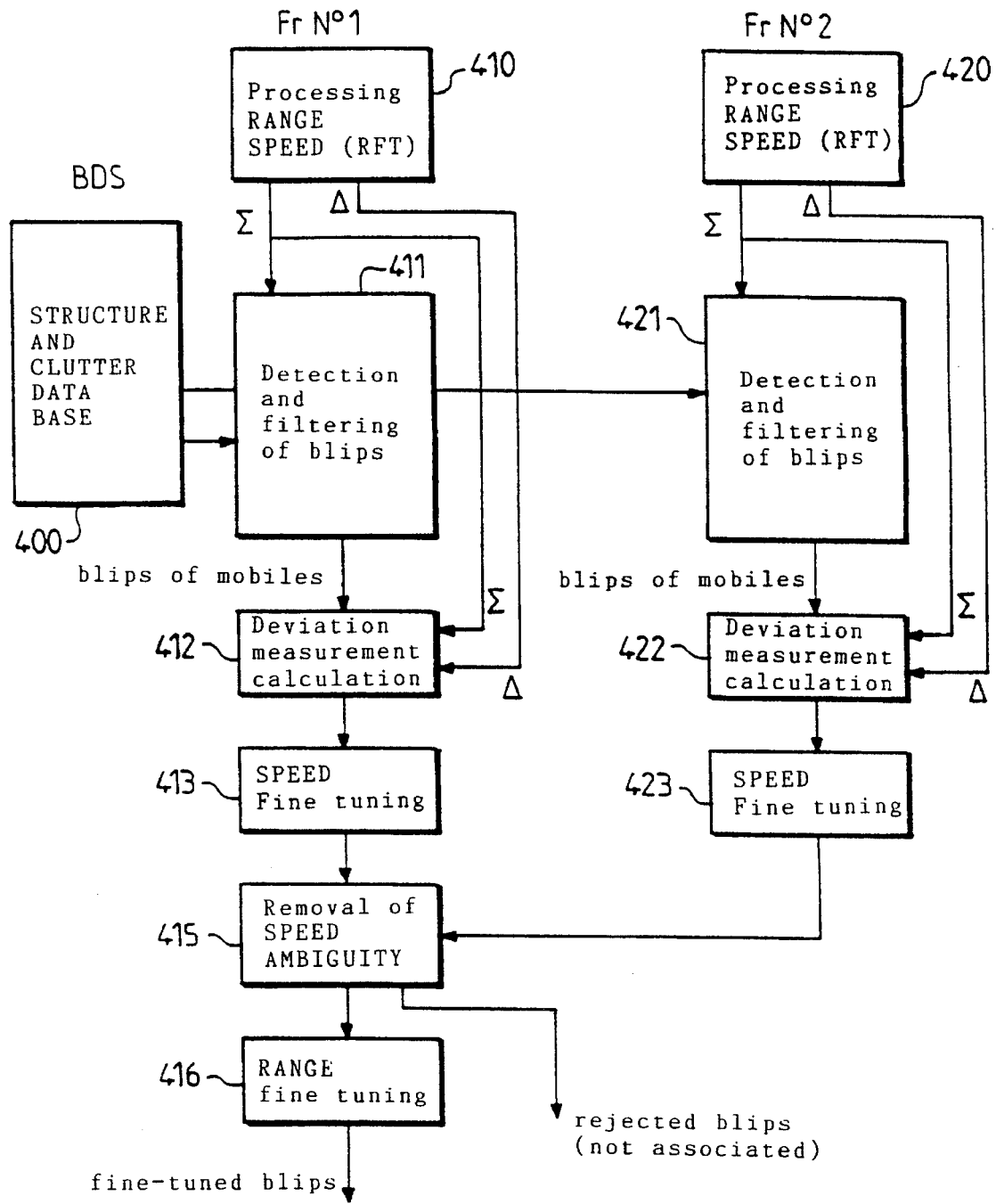

The range processing and these two FFTs are carried out by units 410 and 420 (FIG. 28) for the two respective repetition frequencies. These units are digital signal processors or DSP.

At 411 and 421 are performed the detection and filtering of the radar blips obtained, in the sum channel.

The detection is performed by contrasting with the ground "clutter".

This contrast detection is undertaken with a variable threshold, the value of which is stored as a function of range and azimuth. This clutter memory is regularly updated so as to take the meteorological conditions into account.

Detection of the signal is performed only in the important zones. This validation information is taken from the geographical memory 400 which contains the static information relating to the airport's manoeuvring area.

The sought-after angular accuracy is attained using a technique of monopulse deviation measurement of amplitude (412 and 422), which carries out fine angular tuning in azimuth. The amount of fine tuning depends on the signal-to-noise ratio and hence is greater for large aircraft. It may not be less than 10, this giving an accuracy of the order of 0.15° along the axis and 0.3° with 60° of shift in beam aiming.

After speed fine-tuning (in particular, interpolation between adjacent blips in speed) at 413 and 423, the speed ambiguity is removed by comparison between the responses of the two cycles (415). The bracket thus processed then exhibits an ambiguity in radial speed which is very appreciably in excess of ±100 m/s, which makes it possible to cover the entire spectrum of approach and take-off speeds of aircraft.

Overall, the fine tuning of the radial speed comprises the removal of ambiguity from the information arising from the two processing cycles with different repetition frequencies, and fine tuning of the radial speed by weighting between Doppler filters. The accuracy obtained in radial speed is of the order of 1 m/s.

Fine tuning in range is then undertaken at 416, in particular by interpolation between adjacent blips in range and speed. This range fine-tuning makes it possible to improve the range accuracy if necessary and to obtain the true range by projection of the slant range or short range.

Figure 27:
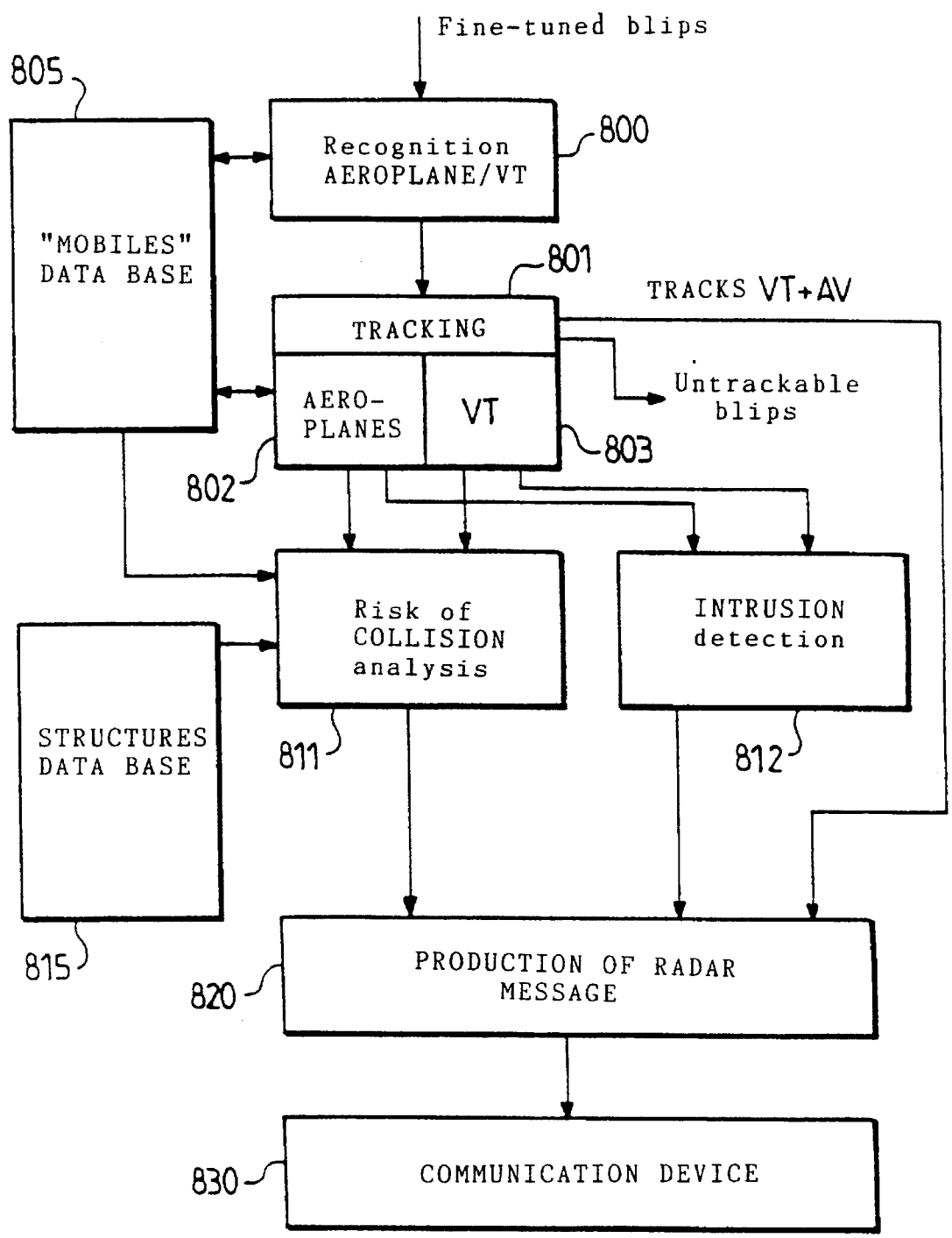
FIGS. 27 and 28 illustrate diagrammatically the data processing and the radar processing according to the invention.

As regards the data processing, it groups together all the processing right from the elementary blips finally retained (800, FIG. 27) up to the generation of radar messages.

It receives the blips arising from the processing of the microwave signal mentioned earlier and those, if appropriate, arising from the preprocessing by a remote radar.

The grouping together of the elementary blips by target (800) is carried out by test of closeness and of continuity between blips in 3 dimensions (range, speed and angle), after which each target is followed or "tracked" at 801.

Classification according to the size of the targets (aeroplanes 802, vehicles 803) is carried out. It is based mainly on the number of blips detected and the distribution of blips, everything in connection with the "mobiles" database 805.

Calculation of the speed vector of the target is performed by projecting the radial speed of the target onto the latter's routing, arising from the geographical memory 815 (runway, taxiway).

Tracking employs extrapolation of the position of the target using the instantaneous speed vector. The future position is predicted with a Kalman filter.

The elimination of ghosts due to the multipath effects is performed by means of an algorithm which relies upon:

a knowledge of the risk zones, the existence of multipath phenomena; these are stored in the geographical memory;

correlation with the presence of other targets; and the realness of the sudden presence of a blip in the relevant zone (the concept of zones of appearance of probable targets).

The information refresh frequency is matched to the relevant zone. Indeed, if it is useful to renew the information at 1 Hz in the zones where the targets are fast and where they are liable to appear to the radar, it is therefore necessary to renew the information.

This is not the case when the targets have low speeds.

It should be stated that electronic scanning having by definition no inertia constraint advantageously allows full matching of the radar scanning to the zone to be scanned.

Lastly, there is provision for end-usage processing which groups together the processing operations performed on the data arising from the aiming. This also relies on the geographical memory.

There may for example be provision for an anti-collision function between targets or between targets and fixed structures. This anti-collision function 811 is produced by extrapolating its positions and speeds by a few seconds.

Subsequent to the anti-collision function, a collision risk information item is delivered.

An intrusion function 812 may also be provided. It relates to the surveillance of the predetermined risk zones as well as the perimeter surveillance of the airport's manoeuvring area.

Advantageously, an abnormal behaviour function is intended to alert the user to an anomaly relating to the trajectory of a "radar track", for example an aeroplane leaving the ground track.

An airport overflight function signals any track or aircraft having a trajectory and speed not corresponding to the normal zones and routings (in the case of helicopters and low-altitude overflights).

The information 820 output by the radar takes the form of elementary blips, targets or tracks all endowed with attributes such as speed, size, risk of collision; this information is numerical and hence available for displays external to the system.

The nature of the information delivered allows the merging of subsequent data with information originating from other sources. Correlation functions such as tagging may thus be readily carried out. Everything is delivered to an appropriate device 830 for communication with man and/or with machine.

Optionally, the radar may be furnished with a graphics processor and with a colour display. In this case, the radar image is calculated in the graphics processor and relayed to the control post in a video standard.

The links between the main radar and the remote radar are of the standard serial link type and allow ready interconnection of means of down-range communication such as radioelectric beams for example.

The phase shifters will now be detailed.

In order to produce the necessary phase law, the principle chosen for the phase-shifter elements is to switch cells for phase-shifting bits and to associate them so as to obtain the desired value. The phase-shifting cells are lengths of transmission lines and their switching uses PIN diodes. The insertion losses of a phase shifter are of the order of 2.5 dB. This device is advantageously reciprocal, it works both in transmission and in reception in the case of diode-based phase shifters.

The main electrical characteristics of the phase-shifter elements are the following:

the operating frequency is in the X band;

the bandwidth is of the order of 150 MHz;

the standing-wave index in transmission/reception is of the order of 2 over 1 at most;

the admissible power is of the order of 3 W peak;

the losses are of the order of 2.5 dB maximum;

the phase shift is of the order of 0°–337.5°;

the elementary increment is 22.5°;

the phase accuracy is 10° RMS;

the settling-down spell is of the order of 10 μs maximum;

the aiming commands are digital, for example 4-bit binary words;

the dimensions are of the order of 90×60×13 mm.

The elementary phase-shifter module incorporates, apart from the phase-shifter itself, the numerical registers required for storing the values despatched by the aiming unit.

The central computer determines the value of the desired angular instruction in bearing at a given instant.

This instruction is broken down into 96 elementary functions covering the desired space.

With each of these 96 elementary functions there correspond 96 words each of 12 bits, including 7 address bits and 4 data bits (the 4 data bits correspond to the phase-shift instructions) stored in a PROM.

A management processor next commands a special bus which feeds the phase shifters with the aid of a small interface.

The address of each phase shifter is forwarded by a device accessible from outside.

It should be observed that there is not necessarily any calculation with regard to the aiming.

The real-time processing of the radar aims to endow the latter with performance in terms of accuracy, domains of ambiguity and separability which approaches the theoretical characteristics related to the illumination and to the waveform.

For example, the filtering increment in range sampling is of the order of 50 m for large gateways and of the order of 5 m for small gateways.

The filtering increment in speed is of the order of 3.75 m/s, whilst the width of the beam along the axis is of the order of 1.5°.

With such characteristics, the performance in range is of the order of about 100 to 4500 m with a non-ambiguous range bracket of 0 to 36 km. The removal of ambiguity is of the order of ±100 m/s with a non-ambiguous speed bracket of the order of ±14 m/s.

The number of primary filters in range sampled at the range increment of 50 m for the 90 large gateways, each comprises 16 filters, in speed 8 filters, and in direction 90 filters, i.e. a total of the order of 1 million filters.

This million filters is calculated twice for each direction (the use of two distinct repetition frequencies is necessary to remove speed ambiguity).

The 120° analysis in azimuth corresponds to 72 processed directions, i.e. to a maximum refresh time of 0.56 s.

The computational power is determined to cover the case of several antennas.

A variant antenna would consist in using a reflector matched to the formation of the inverse cosecant squared lobe, fitted with some one hundred radiating sources laid out longitudinally facing this reflector so as to feed it.

As another variant, the antenna may be a radiating pad in which the waveguides are replaced by a dielectric plate on which are set up printed pads which are functionally equivalent to the slots of the waveguide antenna.

The advantages of the invention may be explained as follows.

In known radars for airport surveillance, it is sought to have excellent angular resolution with the aid of a fine pencil in bearing (typically 0.2° to 0.4°), with mechanical scanning of the antenna, in bearing. Attainment of the requisite resolution with regard to the targets is based essentially on the resolution in range. The pulse duration is therefore chosen to be very short, which results in the need for high transmission power.

The present invention begins from a radically opposite approach, altogether unusual for these radars.

Applicant has observed that an array-antenna radar, which may be endowed with an angular aperture of about 1.5°, can be used under the following conditions:

on furnishing it with sum and difference receive channels, the possibility is obtained of locating a target within the transmitted beam, with an accuracy of up to about 1/15 of its angular aperture, which is sufficient.

nevertheless, such a beam has a basic angle-separating power which is less than that of known radars; however, Applicant has also observed that in the radar proposed the actual separating power depends on the range, azimuth and speed. By improving the use of these three parameters, especially by increasing the repetition frequency, the invention provides access to an effective separating power which is sufficient for the intended application.

Furthermore, the use of a plurality of "comb-like" transmission frequencies, and possibly several different repetition frequencies, makes it possible greatly to improve the accuracy in range which may be of the order of 5 meters, whilst permitting a transmission pulse width greater than that of known radars.

Moreover, numerous advantages ensue from the modularity of the proposed radar. Indeed, it is appreciated that an airport radar has to be permanently operational.

With conventional radars this supposes the duplicating of all the equipment, or almost so.

The radar of the present invention, through its modularity and its appreciably lower power, is much less demanding in terms of auxiliary equipment (ordinary air conditioning in particular), and above all is able to operate in downgraded mode without significant loss of performance, in numerous cases of selective failures, especially that of a column of radiating elements, or of the transmit/receive elements with which it is associated.

Although the proposed radar exhibits particularly marked advantages in the application described, it is also apt in other applications, where the same problems arise.

FORMULAE APPENDIX $$E(y)=A(y) \exp [j.\Phi(y)] \qquad [L1]+p$$

$$E_r(f)=E_t T(f) \qquad [L2]$$

$$\Phi(x)=K(\Theta)x \qquad [L3]$$

We claim:

1. In a radar device for the surveillance of a ground zone, intended to be laid out according to a predetermined geometrical relationship with respect to said ground zone, the improvement wherein it comprises in combination:

(a) fixed antenna means defining an array of radiating elements arranged in vertical columns, each vertical column associated with a respective phase-shifter element, the radiating elements of each vertical column obeying a predetermined phase law, whilst a setting of the phase shifter element is able to change on command from one vertical column to the next so as to provide electronic scanning of space in bearing in the horizontal plane, (b) a transmission source capable of delivering a microwave frequency transmission signal with a predetermined power at at least one predetermined frequency, (c) microwave frequency transmit/receive means with:
(ca) at least one circulator having an input connected to the transmission source, an input/output connected to the array of phase-shifter elements, and an output for delivering a received HF signal,
(cb) at least one transmit channel capable of conveying the transmission signal to the carry of phase-shifter elements via the input of the circulator,
(cc) at least one receive channel capable of conveying the HF signal received from the array of phase-shifter elements via the output of the circulator, and (cd) means for subdividing the receive channel into a sum signal and at least one difference signal, (d) a first receiver and heterodyning mens and a second receiver and heterodyning means respectively receiving the sum and difference signals and providing numerically coded outputs, (e) means for processing said numerically coded outputs from the first and second receiver elements for the radar detection of objects in the zone under surveillance, and (f) means for controlling the phase-shifter array.

2. A device according to claim 1, wherein each column of radiating elements of the antenna is associated with a controlled phase-shifter element, and wherein the microwave frequency transmit/receive means comprise:

m transmit/receive distributors which subdivide the antenna into m groups of n columns of radiating elements, to which groups there correspond m groups of phase-shifter elements, m transmit/receive modules each having an input/output connected to one of the transmit/receive distributors, a transmit signal input, and a receive output, means for connecting the transmit inputs of the m transmit/receive modules to the transmit source, and means for constructing a sum signal and at least one difference signal, from the receive outputs of the m transmit/receive modules.

3. A device according to claim 2, wherein each transmit-receive module comprises a solid-state power amplifier for transmission.

4. A device according to claim 1, wherein each column of radiating elements of the antenna is associated with a controlled phase-shifter element, and wherein the microwave frequency transmit/receive means comprise:

two transmit/receive distributors which subdivide the antenna and the phase shifters into left and right halves, means for constructing a sum signal and at least one difference signal from the two simple inputs/outputs of these two distributors, and a circulator whose input/output receives the sum signal, whilst its input is connected to the transmit source, and whilst its output and the difference signal are taken respectively to the first and second receiver elements.

5. A device according to claim 4, wherein the transmit source comprises an electron tube transmitter.

6. A device according to claim 1, wherein the transmit source comprises a microwave frequency oscillator capable of transmitting a signal with a predetermined frequency and with a predetermined bandwidth, and a frequency synthesizer capable of providing local signals, as well as of cooperating with the microwave frequency oscillator to allow discrete linear modulation of the transmission frequency from pulse to pulse while correspondingly modulating the local signals, the said linear modulation preserving the phase relationship between the various transmission frequencies.

7. A device according to claim 1, wherein the said phase law is produced by construction of the vertical columns of radiating elements.

8. A device according to claim 7, wherein a column of radiating elements is produced via a waveguide with radiating slots, fed by a waveguide/coaxial cable transition.

9. A device according to claim 1, wherein the phase shifters are numerically controlled, diode-based reciprocal phase-shifters.

10. A device according to claim 1, wherein each receiver element comprises at least one frequency change means, followed by an amplitude and phase demodulation means and by means for effecting numerical coding in the form of digital signals having an in-phase component and a phase-quadrature component.

11. A device according to claim 1, wherein for each antenna aiming direction, said transmit source operates on a transmit cycle comprising the transmission of each of the various frequencies several times.

12. A device according to claim 11, wherein the transmission frequencies in the transmit cycle are arranged in an order differing from the precise order of their nominal values.

13. A device according to claim 11, wherein said transmit source operating to repeat the transmit cycle, with a different value of the repetition frequency of the transmit pulses.

14. A device according to claim 1, wherein the signal processing means including a means for processing radar signals having pulse compression to determine range, with monopulse deviation measurement to determine azimuth and with Doppler processing to determine speed.

15. A device according to claim 14, wherein the processing means comprise Fourier transformation means for pulse compression and coherent pulse to pulse integration.

16. A device according to claim 14, wherein the processing means comprises means for detection and filtering of radar signals, for measuring angle deviation, and for refining speed and range.

17. A device according to claim 16, wherein said transmit source operates on a transmit cycle repeated for first and second repetition frequencies of the transmit pulses; and wherein fine-tuning in speed is accompanied by a removal of ambiguity in speed, using the second repetition frequency.

18. A device according to claims 1, wherein the electronic antenna scanning is matched to objects previously detected and to zones to be surveyed.

19. A device according to claim 1, wherein the beam of the radiating element array exhibits an aperture in azimuth along the axis of the order of 1.5°, for an angle of scan in bearing of the order of 150°, with a lobe in elevation of inverse cosecant squared shape.

20. A radar installation for the surveillance of a zone, comprising at least one radar device according to claim 1, and data processing means connected to the signal processing means for the radar surveillance of the said ground zone, as a function of the detection of said objects.

21. An installation according to claim 20, wherein at least a portion of the signal processing means is shared between several radar devices.

* * * * *